Nov. 24, 1964  J. D. McGHEE  3,158,026
SELF-BALANCING MEASURING APPARATUS
Filed Aug. 23, 1960  11 Sheets-Sheet 1
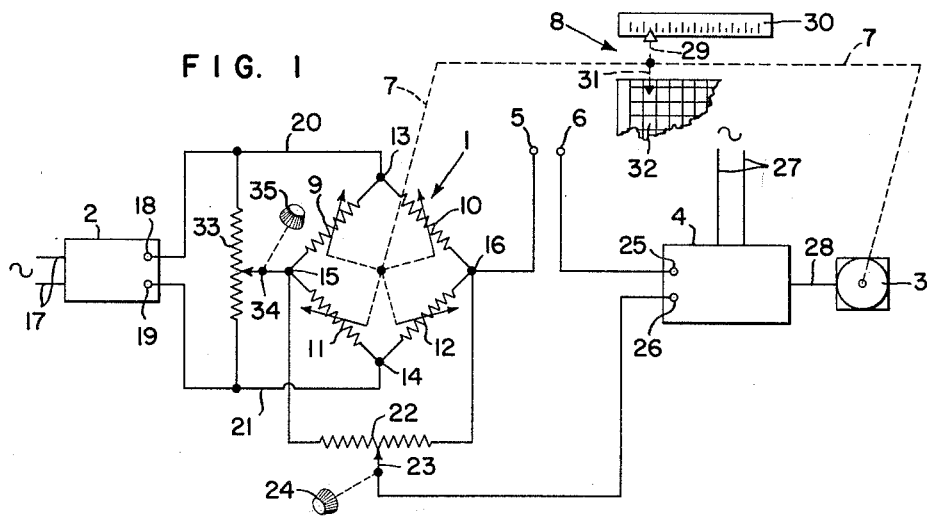
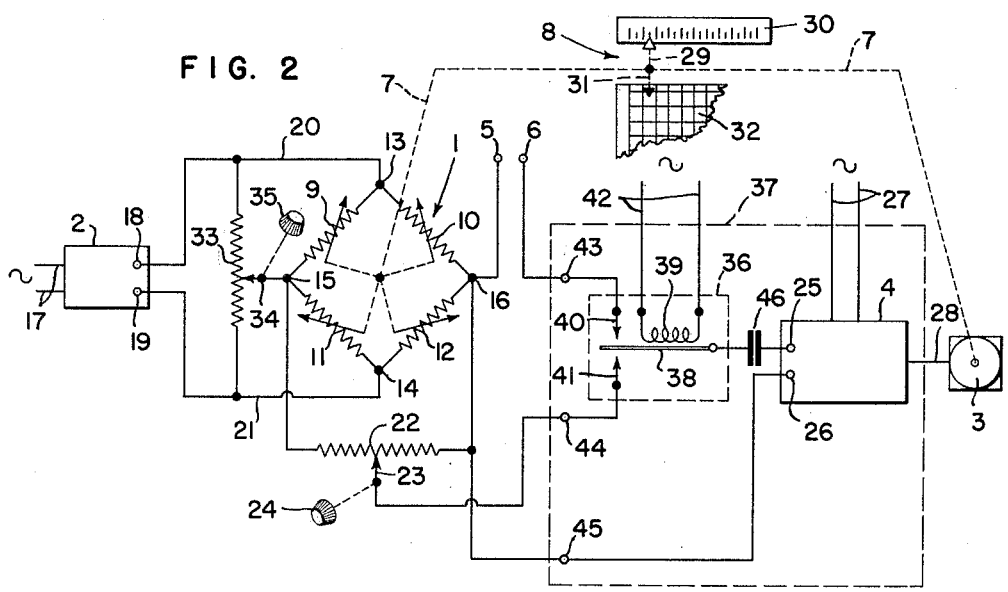
*INVENTOR.*
JOHN D. McGHEE
BY Arthur H. Swanson
ATTORNEY.

Nov. 24, 1964     J. D. MCGHEE     3,158,026

SELF-BALANCING MEASURING APPARATUS

Filed Aug. 23, 1960     11 Sheets-Sheet 2

*INVENTOR.*
JOHN D. McGHEE

BY *Arthur H. Swanson*

ATTORNEY.

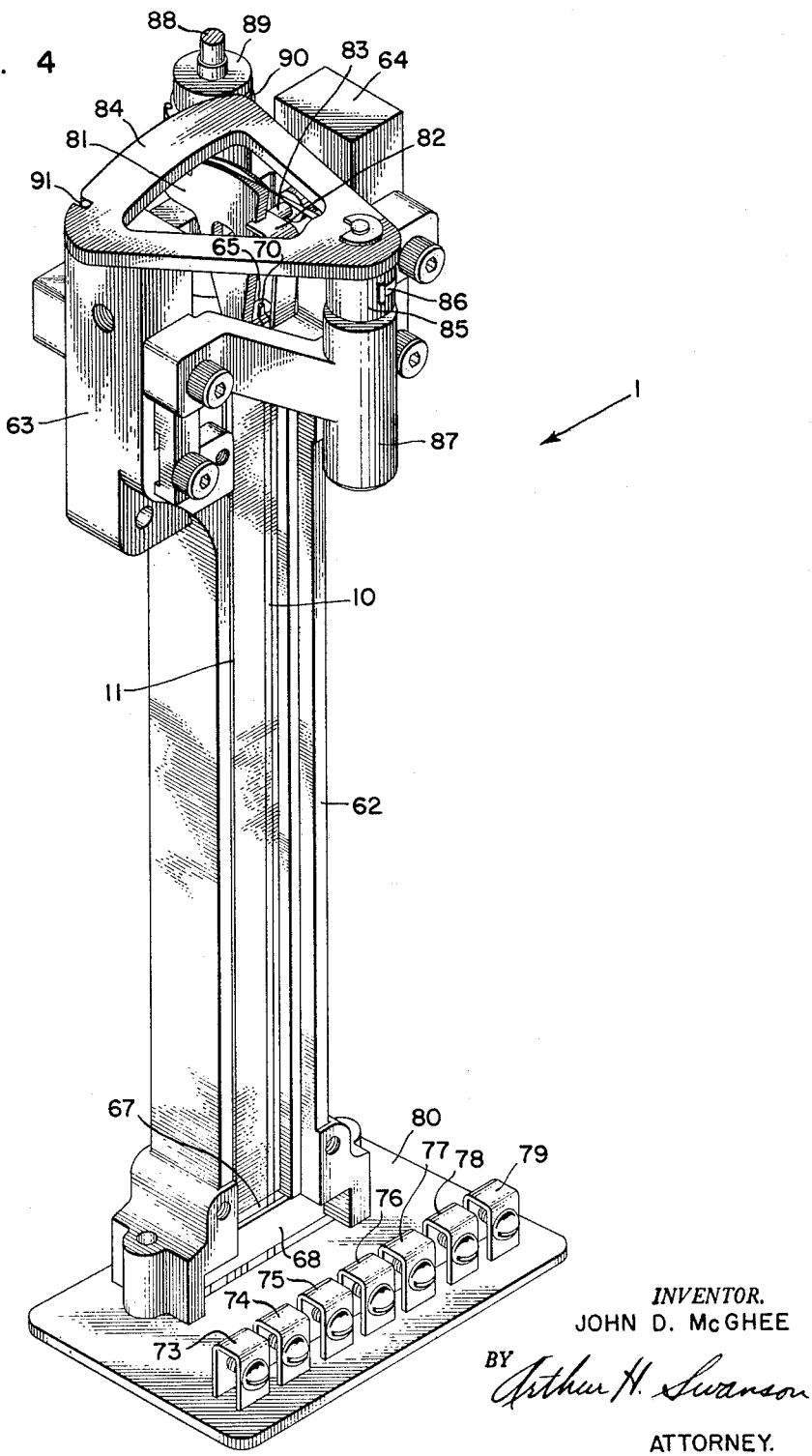

Nov. 24, 1964          J. D. McGHEE                3,158,026
              SELF-BALANCING MEASURING APPARATUS
Filed Aug. 23, 1960                          11 Sheets-Sheet 4

FIG. 6

INVENTOR.
JOHN D. McGHEE
BY Arthur H. Swanson
ATTORNEY.

INVENTOR.
JOHN D. McGHEE
BY Arthur H. Swanson
ATTORNEY.

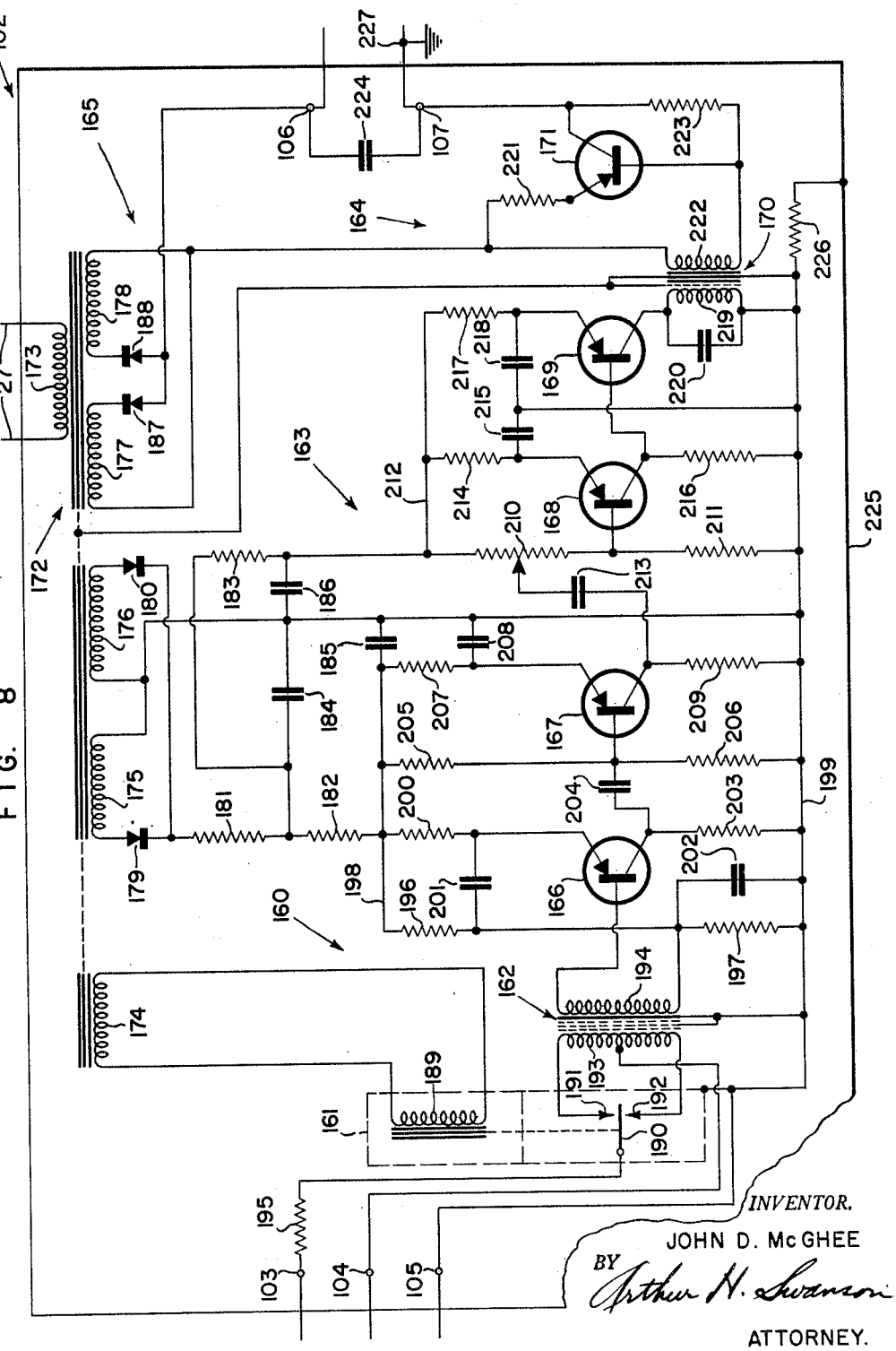

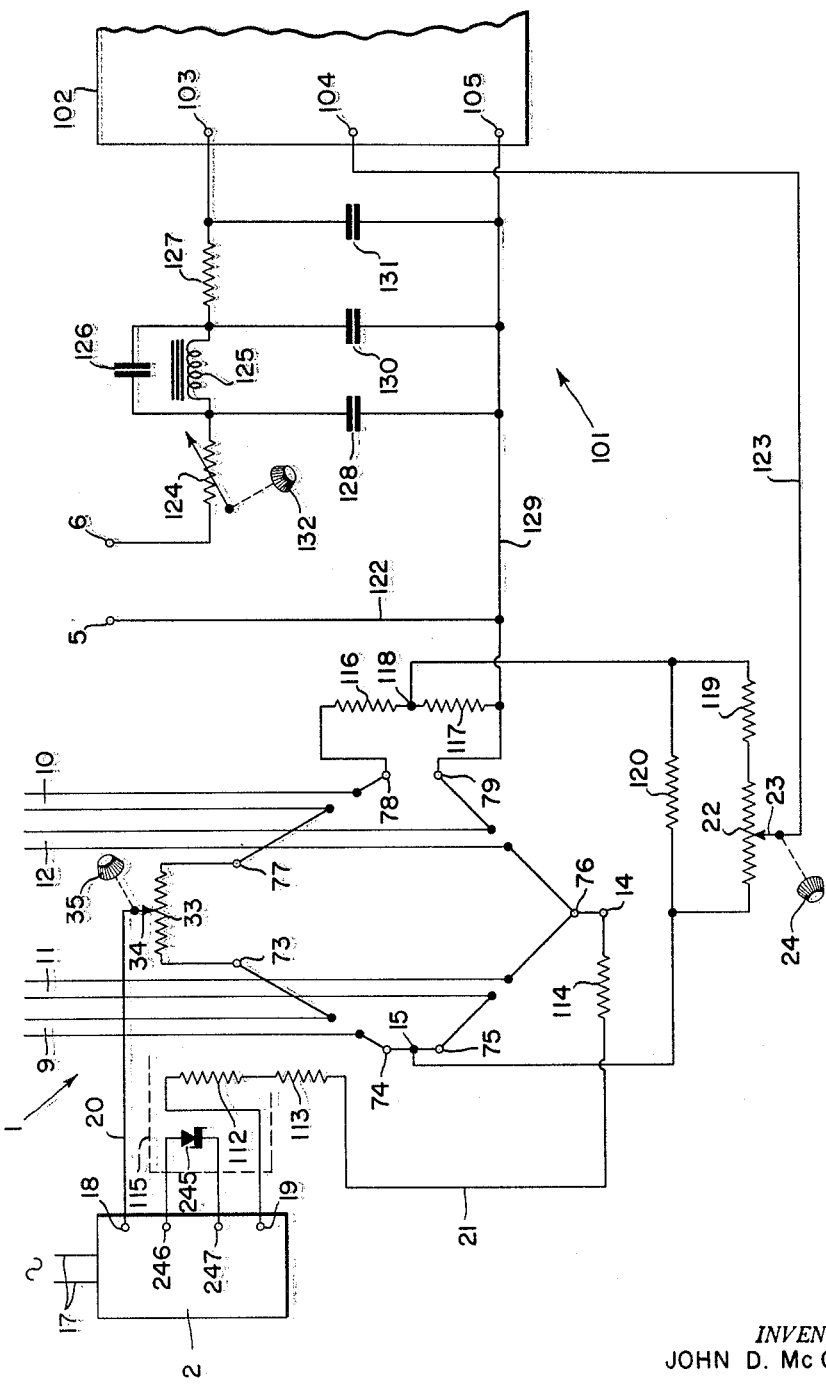

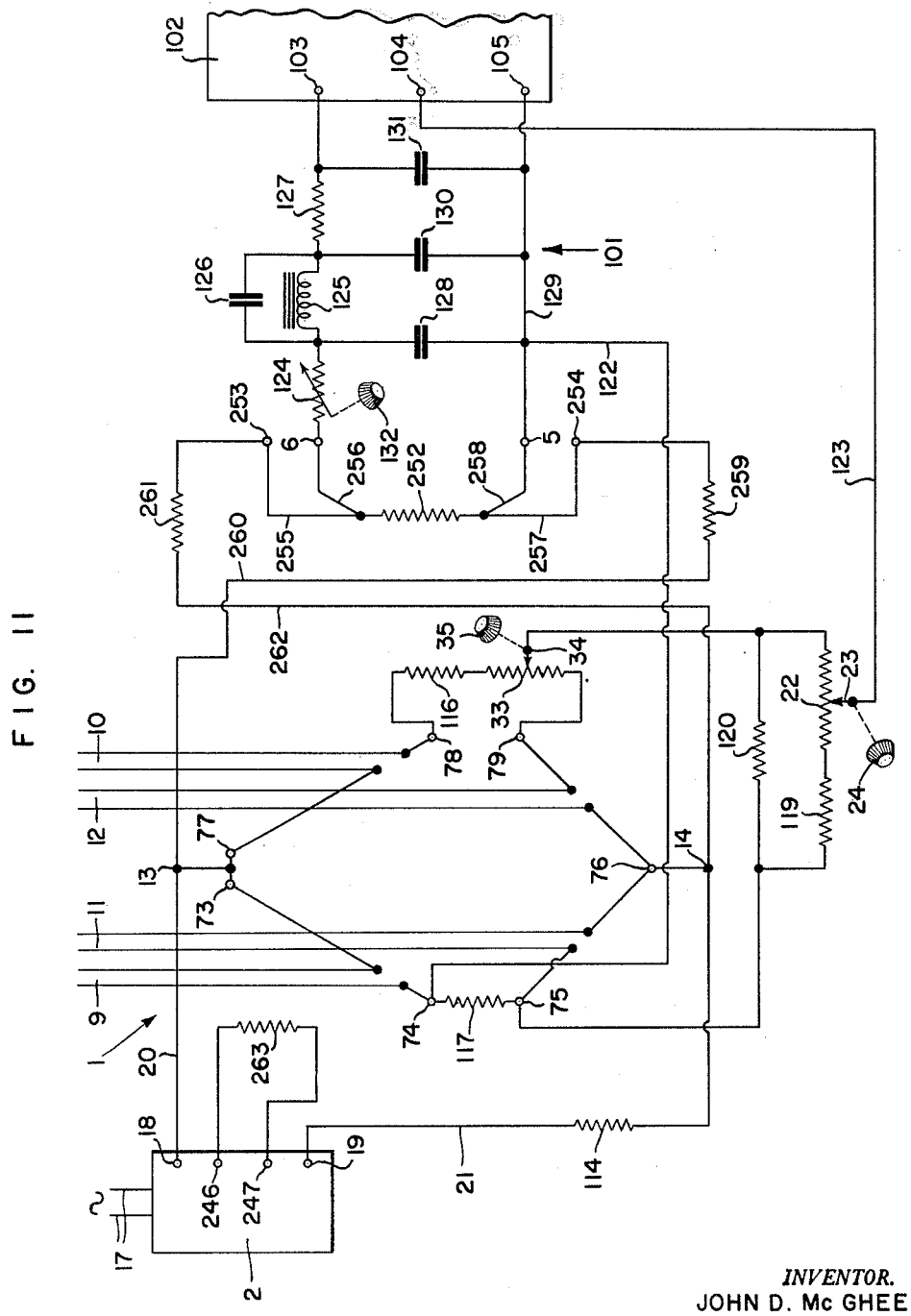

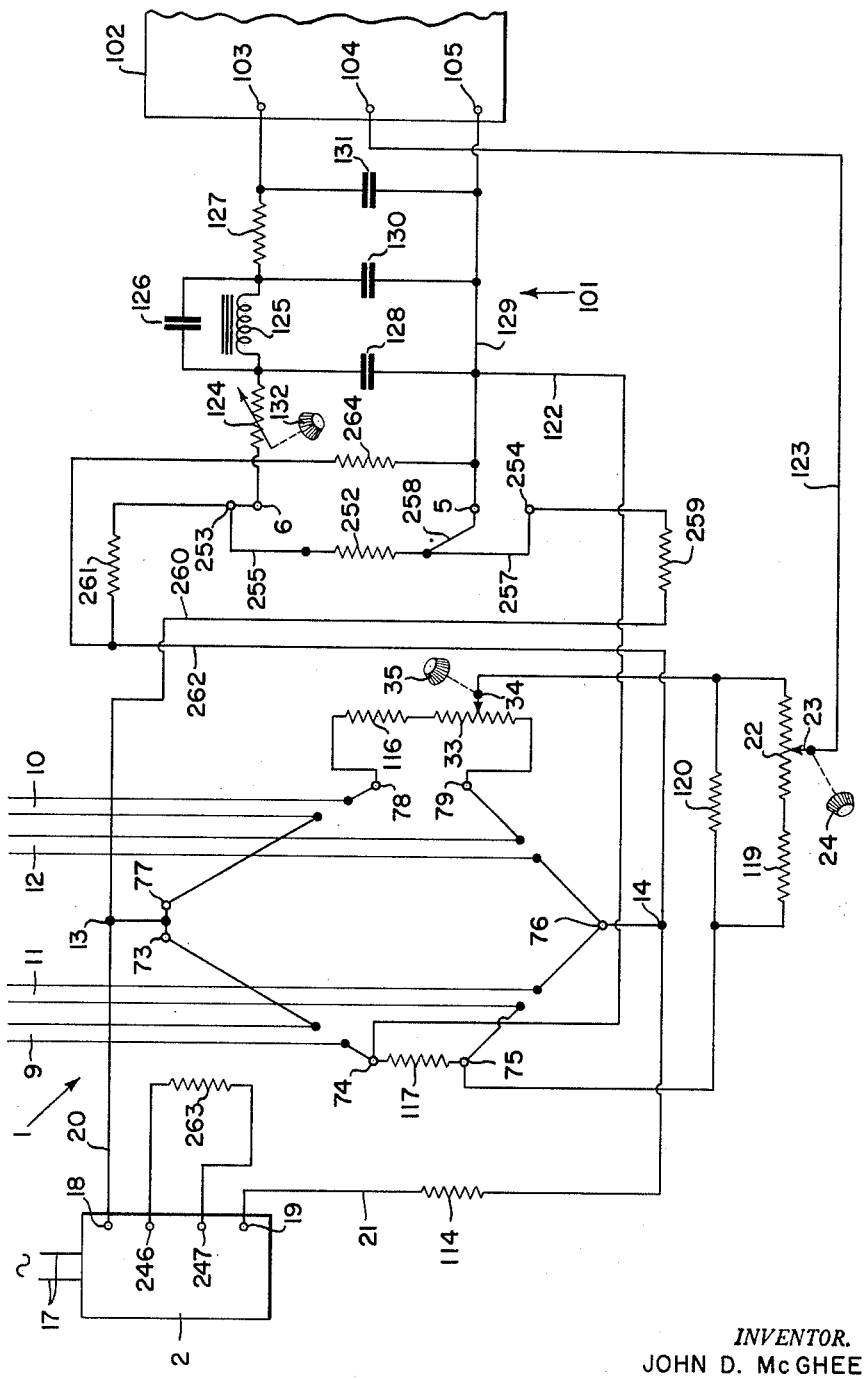

Nov. 24, 1964  J. D. McGHEE  3,158,026
SELF-BALANCING MEASURING APPARATUS
Filed Aug. 23, 1960  11 Sheets-Sheet 10

*INVENTOR.*
JOHN D. McGHEE
BY Arthur H. Swanson
ATTORNEY.

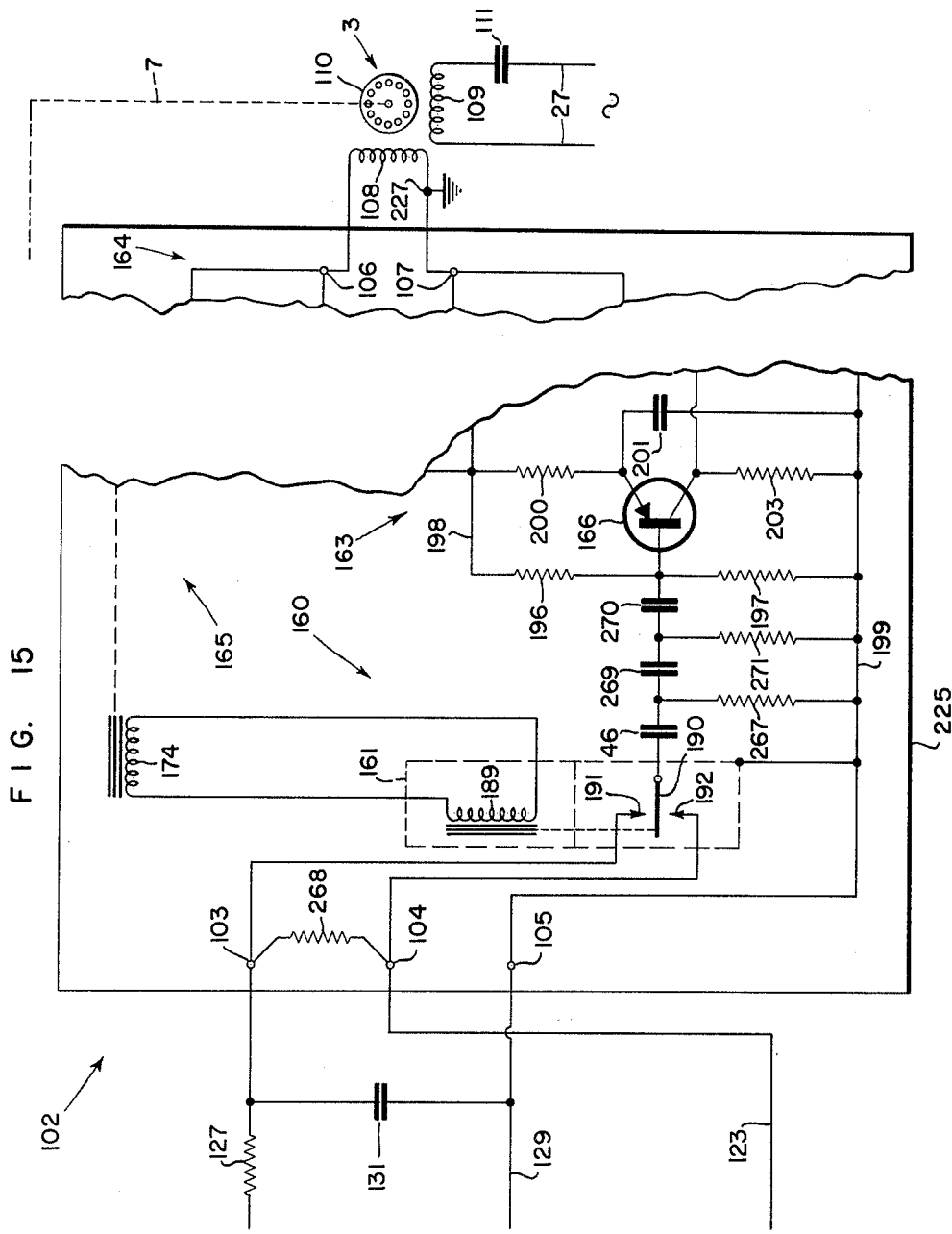

United States Patent Office 3,158,026
Patented Nov. 24, 1964

3,158,026
SELF-BALANCING MEASURING APPARATUS
John D. McGhee, Plymouth Meeting, Pa., assignor to Honeywell Inc., a corporation of Delaware
Filed Aug. 23, 1960, Ser. No. 51,378
14 Claims. (Cl. 73—361)

The present invention relates generally to electrical self-balancing or servo-rebalancing apparatus for providing measuring, recording, and other allied functions. More specifically, the invention relates to the type of such apparatus wherein a rebalancing motor, which is responsive to any difference or error between the output of a balancing element and an electrical quantity to be measured, continuously adjusts the balancing element as necessary to eliminate such difference, whereby the adjusted condition of the balancing element is a measure of the quantity to be measured.

A general object of the present invention is to provide improved self-balancing apparatus of the foregoing type, wherein significantly improved operation, improved freedom from malfunctioning, and other significant advantages are obtained by the use of a novel rebalancing technique. A specific object of the invention is to provide such improved apparatus wherein an electrical strain-sensitive device is employed as the balancing element.

A more specific object of the invention is to provide a novel combination of novel circuitry and mechanical arrangements in apparatus of the foregoing type for enabling such apparatus to effect its rebalancing operation by controlling or adjusting a strain-sensitive balancing device. A still more specific object of the invention is to provide such an improved and novel apparatus combination wherein a novel measuring circuit or balanceable network co-operates with a novel configuration of strain-sensitive elements and a novel mechanical rebalancing linkage to cause the rebalancing motor to adjust the strain on said elements through said linkage automatically and continuously as required to maintain the circuit substantially continuously in balance.

An even more specific object of the invention is to provide such improved appartus wherein the balancing device includes a plurality of resistive strain-sensitive or strain gauge elements connected in an advantageous bridge circuit arrangement, and wherein the measuring circuit and associated amplifying and driving means for the rebalancing motor, as well as the balancing device itself and the mechanism through which the motor adjusts it, include novel features which permit and enhance the use of such a strain-sensitive bridge arrangement as the balancing means of the apparatus combination.

Another specific object of the invention is to provide the specific novel circuits, mechanisms, and strain-responsive devices which advantageously cooperate in the apparatus combination just described to provide practically important features of simple and rugged construction, fast, accurate and reliable operation, and a high degree of freedom from malfunctioning and failure, even under adverse operating conditions.

Self-balancing measuring, indicating, recording, and/or controlling apparatus of the general type referred to hereinbefore is well known in the art, and is widely used in a multiplicity of applications and for a multiplicity of purposes. For example, one widely used and well known type of such apparatus is that disclosed in the Wills Patent No. 2,423,540 of July 8, 1947. In these known forms of such apparatus, as typified by the Wills patent apparatus, it has been almost universally the practice to employ an adjustable contacting or slide-wire resistor as the balancing element adjusted by the rebalancing or servo motor.

Although such slide-wire resistors provide acceptable performance as balancing elements in many applications of the self-balancing apparatus containing them, such resistors suffer from a number of inherent characteristics which make them undesirable, impractical, and even unusable as balancing elements for self-balancing apparatus in many other applications. The problems of maintenance, failure, and insufficient accuracy encountered as a result of using slide-wire resistors as balancing elements are well known, and need not be elaborated on in detail herein. Suffice it to say that these problems result from such things as poor contacting, due to contact wear and corrosion and to vibration and resulting contact bounce, insufficient resolution, and breakage of the wire of the resistors, due to unequal expansions and the like, and that all of these things result from the inherent characteristics of the slide-wire resistors.

In an attempt to arrive at a self-balancing apparatus which would not be subject to the foregoing disadvantages when used under the conditions for which slide-wire resistors are unsuitable or unusable, it has been proposed in the past to use various other adjustable devices as balancing elements. Among these devices are variable liquid resistors, capacitors, and differential transformers. However, as is well known, the introduction of each of these devices into a self-balancing apparatus as the balancing element therein has also introduced problems individual to such use of that particular device, and stemming from the characteristics thereof. Thus, none of the previously known self-balancing arrangements using the various known balancing devices has been entirely suitable under the various demands of practical applications.

Accordingly, it is a prime object of the present invention to provide improved, novel self-balancing apparatus which is characterized by freedom from the foregoing inherent disadvantages of the previously known types of such apparatus with their slide-wire resistor and other known types of balancing elements, and which is superior to such previously known apparatus with respect to simplicity of construction, operation, and maintenance, with respect to accuracy and reliability, and with respect to practical utility under what would previously have been adverse operating conditions.

To the end of fulfilling the object just stated, as well as those set forth hereinbefore, the self-balancing apparatus according to the present invention includes a plurality of strain-sensitive resistance wires which serve collectively as the balancing device of the apparatus. A suitable mechanical rebalancing linkage mechanically couples these wires to a rebalancing motor so that rotation of the latter changes the amount of strain on each of the wires, and hence its resistance, in a corresponding manner, and in a direction dependent upon the direction of motor rotation. The wires are electrically included in a bridge circuit which is energized from a suitable source of current. Thus, the output of this balancing bridge is a balancing voltage of a magnitude which is dependent upon the extent and direction of rotation of the rebalancing motor.

The balancing voltage output of the bridge is compared in a measuring circuit or network to a voltage whose value is to be measured. In certain forms of the invention apparatus as illustrated herein, this "unknown" voltage is that of a thermocouple or other source of voltage, while, in other forms of the apparatus, this voltage is one representative of a resistance value to be measured, such as that of a resistance thermometer element. In each case, the measuring network is of a specific, novel configuration which is related to the nature of the particular source of the voltage being measured, and produces in its output an error signal representative of any difference between the unknown and balancing voltages. Thus, this error signal is representative of any need for readjustment of the balancing device and the balancing voltage as necessary to make the latter balance the voltage being measured and reduce the error signal substantially to zero.

The foregoing error signal in the output of the measuring network is amplified, and is used to control the rotation of the rebalancing motor so that the above balancing action is continuously carried out automatically in the apparatus. As a result, the apparatus is maintained substantially continuously in balance. Accordingly, the magnitude of the strain on the wires of the balancing device, as represented by the deflection or position of a member of the rebalancing linkage, is a measure of the value of the voltage or other quantity being measured.

In one form of the illustrated apparatus according to the invention, the strain-sensitive wires are in the form of strain gauges which are bonded onto a deflectable member which is a part of the rebalancing linkage, whereby rotation of the rebalancing motor changes the deflection of this member, the strain on the gauges, and the output of the balancing bridge. In another form of the illustrated apparatus, the strain-sensitive wires are unbonded ones, and are supported between a stationary member and a rotatable member of the rebalancing linkage in such a manner that rotation of the rotatable member changes the tension in the wires. The rotatable member is rotated by the rebalancing motor through the remainder of the rebalancing linkage, whereby rotation of the motor changes the tension and resistance of the wires, and hence changes the balancing bridge output.

The means by which the unknown and balancing voltages are compared to form the error signal may also be of different forms according to the invention. In one illustrated form, these two voltages are effectively compared continuously in the input of an amplifier, to which they are applied in series opposition. In another illustrated form, the opposing unknown and balancing voltages are applied alternately in rapid succession to the amplifier input by means of a synchronous switch. In each form, the resulting error signal is amplified in the amplifier, and is used to control the rotation of the rebalancing motor.

A better understanding of the present invention may be had from the following detailed description of apparatus embodying the invention, which description is to be read in connection with the accompanying drawings, wherein:

FIG. 1 is a basic circuit diagram of self-balancing measuring and recording apparatus according to the present invention;

FIG. 2 is a circuit diagram of a modified form of the apparatus of FIG. 1;

FIG. 4 is a pictorial representation of a different form of balancing element suitable for use in the apparatus of FIG. 1 or FIG. 2;

FIG. 6 is a circuit diagram showing in detail a form of self-balancing apparatus following the basic circuits of FIG. 1 or FIG. 2 and including the balancing element of FIG. 4;

FIG. 8 is a circuit diagram of amplifying and motor driving means suitable for use in the apparatus of FIG. 6 and following the basic circuit of FIG. 1;

FIG. 10 is a circuit diagram of a modified form of a portion of the FIG. 6 apparatus useful when voltages are to be measured;

FIGS. 11 and 12 are circuit diagrams of modified forms of a portion of the FIG. 6 apparatus useful when resistances are to be measured.

FIG. 15 is a circuit diagram of a modification of the input portion of the FIG. 8 means following the basic circuit of FIG. 2.

THE APPARATUS OF FIG. 1

Figure 5:
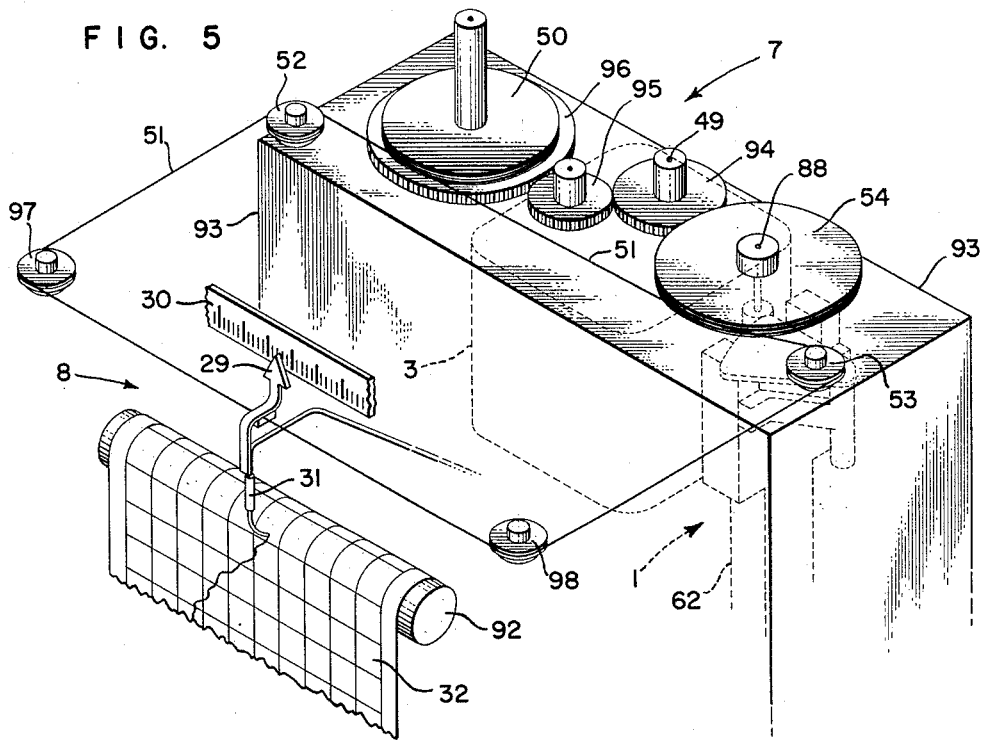
FIG. 5 is a pictorial representation of a suitable form of drive mechanism for the balancing element of FIG. 4.

In FIG. 1 there is shown self-balancing measuring and recording apparatus embodying the present invention and hence employing a strain-sensitive device 1 as the balancing element. The FIG. 1 apparatus also includes a power supply 2, a rebalancing motor 3, an amplifying and motor driving means 4, measuring input terminals 5 and 6, a mechanical rebalancing linkage 7, and indicating and recording means 8, as well as other components to be described hereinafter. The balancing device 1 includes strain-sensitive elements or resistance wires 9, 10, 11 and 12 connected to form a balancing bridge circuit.

As will be described in more detail hereinafter, the balancing bridge circuit is energized by the power supply 2, and produces a balancing voltage output of a magnitude dependent upon the amount of strain on the resistance wires 9, 10, 11, and 12. The amount of this strain, and hence the magnitude of the balancing voltage, is changed by the rotation of the rebalancing motor 3 acting on the wires 9, 10, 11, and 12 through the rebalancing linkage 7, motor rotation in one direction serving to increase this voltage, and motor rotation in the opposite direction serving to decrease it. This balancing voltage produced by the bridge circuit is compared in a measuring network with the unknown voltage to be measured, which is introduced into the apparatus by means of the input terminals 5 and 6. The resulting error voltage, representing unbalance between the unknown and balancing voltages, appears in the output of the measuring network, is amplified by the means 4, and is used to control the rotation of the motor 3 and hence the amount of strain on wires 9, 10, 11, and 12 and the value of the balancing voltage. As a result, the motor 3 continuously adjusts this strain and balancing voltage, through the linkage 7, as necessary to maintain the balancing voltage balanced against the unknown voltage to give substantially zero error signal. Accordingly, the means 8, which is actually positioned in accordance with the magnitudes of the above strain and balancing voltage, provides an indication and record of the value of the unknown voltage.

Turning now to the details of the FIG. 1 apparatus, the balancing bridge circuit of the balancing device 1 has a first input or energizing terminal 13 to which the resistance wires 9 and 10 are connected, and has a second input or energizing terminal 14 to which the resistance wires 11 and 12 are connected. Further, this bridge circuit also has a first output terminal 15 to which the wires 9 and 11 are connected, and a second output terminal 16 to which the wires 10 and 12 are connected.

The above bridge circuit of the device 1 is supplied with energizing voltage and current from the power supply 2. Specifically, the later has input conductors 17 which are adapted to be connected to a suitable source of alternating energizing voltage, not shown, and has output terminals 18 and 19. The terminals 18 and 19 are connected by respective conductors 20 and 21 to the respective bridge input terminals 13 and 14. When the FIG. 1 apparatus is to be used for measuring and recording the values of D.C. signals applied between the input terminals 5 and 6, the power supply 2 should be one which supplies D.C. energizing voltage to the balancing bridge circuit. In such cases, the supply 2 may be replaced by a battery, if desired. When the apparatus is to be used to measure A.C. signals, the supply 2 should be one which supplies A.C. energization to the balancing bridge.

In addition to the components described above, the FIG. 1 apparatus includes a span adjusting resistor 22. The body of this resistor is connected between the bridge output terminals 15 and 16, and its adjustable contact 23 is adapted to be manually adjusted by a knob 24 for a purpose to be described hereinafter. The effective output or balancing voltage of the device 1 appears between this contact 23 and the bridge output terminal 16.

The comparison of the balancing voltage to the unknown voltage to be measured is accomplished by applying these two voltages in series opposition in a measuring circuit or network to the input of the amplifying and motor driving means 4. To this end, one of the input terminals 25 of the means 4 is connected to the measuring input terminal 6, while the other measuring input terminal 5 is connected to the balancing voltage terminal 16. Finally, the contact 23 is connected to the remaining input terminal 26 of the means 4. These connections form the aforementioned measuring network, the output of which is connected to the input terminals 25 and 26 of the device 4.

The polarities of the balancing and unknown voltages in the series circuit of the measuring network are made to be such that, when the balancing voltage between the contact 23 and the terminal 16 is equal to the unknown voltage between the input terminals 5 and 6, zero resultant or error voltage will be applied by the network output to the input terminals 25 and 26 of the means 4.

The means 4 may be any of the known amplifying and motor driving devices used in the known self-balancing apparatus and capable of driving the motor 3 in response to an error signal of other than zero appearing between the input terminals 25 and 26. For example, when the unknown and balancing voltages are D.C. ones, the device 4 may be the device 17 of the aforementioned Wills patent, or may be the means shown in FIG. 8 hereof and to be described hereinafter. When the unknown and balancing voltages are A.C. ones, the device 4 may be that of FIG. 38 of the aforementioned Wills patent. It is sufficient for the present purposes to note that, when the unknown voltage is greater or less than the balancing voltage, the resulting error voltage of respectively one or the opposite polarity or phase applied between the input terminals 25 and 26 causes the device 4 to energize the motor 3 for rotation in one or the opposite direction, depending upon said polarity or phase. To this end, the device 4 has energizing conductors 27 which are adapted to be connected to a suitable source of alternating energizing voltage, not shown. The output of the device 4 for driving the motor 3 is applied to the latter over conductors 28.

Figure 3:
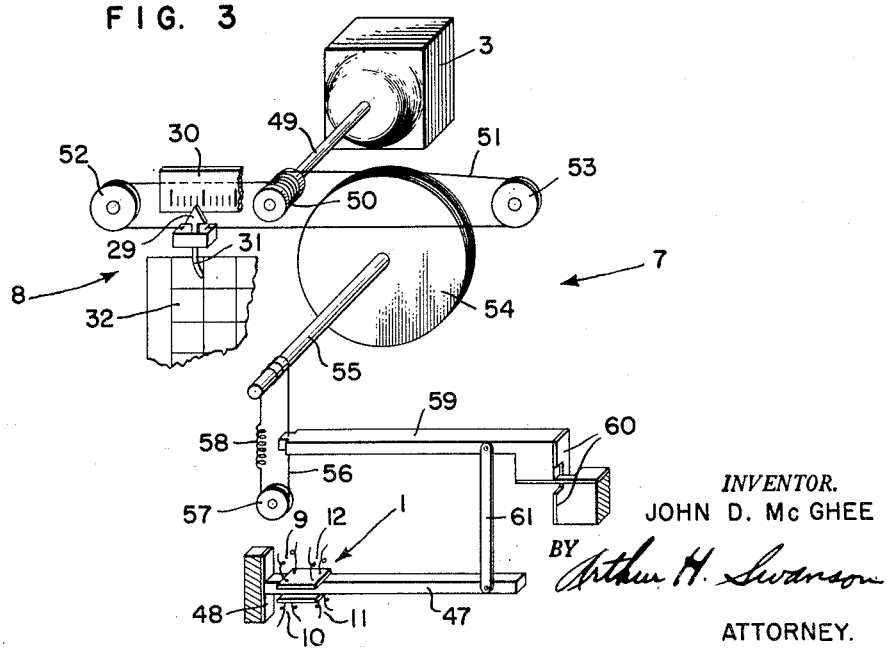
FIG. 3 is a pictorial representation of the details of a form of balancing element and drive mechanism suitable for use in the apparatus of FIG. 1 or FIG. 2.

As previously noted, the rotation of the motor 3 acts through the rebalancing linkage 7 to change or adjust the strain on the resistance wires 9, 10, 11, and 12 collectively, and hence to change the magnitude of the balancing voltage correspondingly. To this end, the linkage 7 mechanically couples the output shaft of the motor 3 to the wires 9, 10, 11, and 12 in such a manner that rotation of the motor shaft in one direction increases the strain on the wires 10 and 11 and decreases the strain on the wires 9 and 12, while rotation of the motor shaft in the opposite direction decreases the strain on the wires 10 and 11 and increases the strain on the wires 9 and 12. In this way, the value of the balancing voltage is adjusted by the rotation of the motor 3, being increased for motor rotation in said one direction, and being decreased for motor rotation in said opposite direction. Thus, the balancing voltage is always changed in the proper direction to reduce the resulting error signal to zero. Specific arrangements for the balancing device 1 and linkage 7, as well as the indicating and recording means 8, are illustrated in FIGS. 3, 4, and 5 herein, and will be described hereinafter.

Since the apparatus just described causes the collective strain on the resistance wires 9, 10, 11, and 12 and the resulting balancing voltage to be adjusted to a specific, balancing value for each different value of the voltage being measured, and since there is a corresponding discrete condition or position of the rebalancing linkage 7 for each value of the balancing voltage, the linkage 7 is caused to have at substantially all times a condition or position corresponding to the then-existing value of the voltage being measured. Accordingly, in the means 8, a pointer 29, which is positioned by the linkage 7 along a calibrated scale 30, provides an indication of the values of the measured voltage. Additionally, a pen 31, which is positioned along with the pointer 29 by the linkage 7 relative to a recording chart 32, provides a record of these values.

In the foregoing description of the FIG. 1 apparatus, it has been stated that there is a corresponding, discrete value of balancing voltage produced by the balancing device 1 for each value of strain on the resistance wires 9, 10, 11, and 12 collectively, and hence for each position of the pointer 29 along the scale 30. While this is true for any given calibration or adjustment of the range of the apparatus, it is also true that the relationship between the balancing voltage and the strain and pointer position can be varied in order to permit the apparatus to be used for measuring voltages lying within different ranges. In other words, it may, for example, be advantageous to have the low and high ends of the scale 30 correspond respectively to zero and one hundred millivolts at one time, and to have these ends of the scale 30 correspond respectively to thirty and sixty millivolts at another time. Such adjustment of the range of the FIG. 1 apparatus is effected by adjusting the span and zero resistors of the apparatus, as will now be explained.

Turning first to the span adjusting resistor 22, it is noted that the adjusted position of the contact 23 along the body of the resistor 22 determines the percentage of the balancing voltage output of the bridge circuit, between the terminals 15 and 16, which is actually used as the balancing voltage to be compared to the unknown voltage. Accordingly, the adjusted position of the contact 23 determines the span of the apparatus: that is, the number of measuring units, such as millivolts, extending between the low and high ends of the scale 30.

In addition to the span resistor 22, the FIG. 1 apparatus includes a zero adjusting resistor 33. The body of this resistor is connected between the input terminals 13 and 14 of the balancing bridge circuit, and the adjustable contact 34 of this resistor is connected to the bridge output terminal 15. A knob 35 permits the manual adjustment of the contact 34 along the body of the resistor 33. Such adjustment determines the value which the bridge circuit output voltage will have for a given value of the collective strain on the wires 9, 10, 11, 12, and hence for a given position of the pointer 29 and the pen 31. Accordingly, the adjusted position of the contact 34 determines the so-called zero and suppression values for the apparatus. Thus, the combination of this adjustment with the adjustment of the span resistor contact 23 determines the over-all range of the apparatus: that is, the actual values of the unknown voltage represented by the calibration marks on the scale 30 and the chart 32, from one end to the other.

OPERATION OF THE FIG. 1 APPARATUS

The operation of the FIG. 1 apparatus for any given adjustment of the resistors 22 and 33, and for increases and decreases in the value of a D.C. voltage to be measured, will now be described by way of example. Assuming first that the apparatus is in balance, and hence that the value of the balancing voltage between the contact 23 and the terminal 16 is equal and opposite to the value of the unknown voltage between the terminals 5 and 6, the value of the error signal between the terminals 25 and 26 will be zero, and the motor 3 will not be energized for rotation in either direction. Accordingly, the motor 3, linkage 7, and pointer 29 will be stationary, with the pointer 29 indicating on the scale 30 the existing value of the unknown voltage. The amount of strain on the resistance wires 9, 10, 11, and 12 collectviely will also be steady, at the value necessary to produce the needed value of balancing voltage.

If the unknown voltage now increases to a new, higher value, the apparatus will become unbalanced momentarily, since the existing value of the balancing voltage will no longer be equal and opposite to the value of the unknown voltage. As a result, the value of the error signal in the output of the measuring network will rise from zero with a given polarity representative of the fact that the unknown voltage is now greater than the balancing voltage. This signal will then cause the means 4 to energize the motor 3 for rotation in a direction corresponding to said given polarity, which will be the direction necessary to so change the strain on the wires 9, 10, 11, and 12 as to increase the balancing voltage and hence decrease the error signal. Specifically, in the particular apparatus being described by way of example, this rotation of the motor 3 will progressively increase the strain and resistance of the wires 10 and 11, and will progressively decrease the strain and resistance of the wires 9 and 12.

The foregoing rotation of the motor 3, adjustment of the strain on the wires 9, 10, 11, and 12, increase in the balancing voltage, corresponding up-scale movement of the pointer 29, and decrease in the error signal will continue until the balancing voltage has been increased to a new, higher value at which it again is equal and opposite to the unknown voltage, and the error signal is zero. At this time, the voltages and the apparatus will again be in balance, with the new position of the pointer 29 indicating on the scale 30 the new, higher value of the unknown voltage.

If the unknown voltage now decreases to a lower value, the apparatus will again become unbalanced momentarily, and the value of the error signal will rise from zero with a polarity opposite to that which it had in the previous example. This error signal of opposite polarity will cause the means 4 to energize the motor 3 for rotation in the opposite direction, corresponding to said opposite polarity. As a result, the pointer 29 will be moved down-scale, and the strain on the wires 9, 10, 11, and 12 will be changed in the direction to reduce the balancing voltage and error signal. This will continue until the error signal has once again been reduced to zero, at which time the voltages and apparatus will again be in balance, with the new position of the pointer 29 again indicating on the scale 30 the existing value of the unknown voltage.

It should be noted that each rebalancing operation as just described is consummated in practice in a very short time, whereby the apparatus is maintained substantially continuously in balance as noted hereinbefore.

THE APPARATUS OF FIG. 2

The apparatus illustrated in FIG. 2 is the same as that of FIG. 1 as described above, except as to the means by which and the manner in which the balancing and unknown voltages are compared to produce the error signal, and as to the nature of this signal. In the FIG. 2 apparatus, this comparison is effected in a measuring network by means of a synchronous switch or chopper 36 included in a unit 37 which also includes an amplifying and motor driving means 4. In the FIG. 2 apparatus, the means 4 must be one which is responsive to A.C. signals, as will become apparent from the following description. Therefore, the means 4 may be of the aforementioned type of FIG. 38 of the Wills patent. Alternately, the unit 37 may be of the type shown in FIG. 15 hereof and to be described hereinafter. In the FIG. 2 apparatus, components which are the same as those in the FIG. 1 apparatus bear the same reference numerals as their FIG. 1 counterparts.

The switch 36 may advantageously be of the well known type shown in the aforementioned Wills patent. To this end, the switch 36 has a movable contact 38 which is driven by a winding 39 into alternate engagement with stationary contacts 40 and 41. The winding 39 is energized by means of conductors 42 which are adapted to be connected to a suitable source of alternating energizing voltage, not shown. In the manner explained in said Wills patent, the contact 38 is caused to engage first the contact 40 and then the contact 41 repetitively at a rate dependent upon the frequency of the alternating current supplied to the conductors 42.

In the measuring network of the FIG. 2 apparatus, the measuring input terminal 6 is connected by way of a unit input terminal 43 to the switch contact 40, while the balancing voltage contact 23 is connected by way of a unit input terminal 44 to the switch contact 41. The remaining measuring input terminal 5 and the remaining balancing voltage terminal 16 are connected together, and are connected by way of a unit input terminal 45 to the input terminal 26 of the amplifying device 4. The other input terminal 25 of the latter is connected through a condenser 46 to the movable switch contact 38. Therefore, as the contact 38 alternately engages the contacts 40 and 41, the unknown voltage terminals 5 and 6, and the balancing voltage terminal 16 and contact 23, are alternately connected to the input terminals 25 and 26 of the device 4 through the condenser 46.

As a result of the foregoing connections and operation, an A.C. error signal is produced in the measuring network output having a magnitude which is dependent upon the difference between the unknown and balancing voltages. This error signal is applied between the input terminals 25 and 26 of the device 4. As in the FIG. 1 apparatus, the polarities of the unknown and balancing voltages are made to be such that, when these two voltages are equal in magnitude, zero error signal is applied from the measuring network output to the input terminals 25 and 26. This occurs when the apparatus is in the balanced condition.

Upon a change in one direction in the value of the unknown voltage from the value had at system balance, the resulting A.C. error signal has a phase, with respect to the voltage between the conductors 42, which corresponds to this said one direction of change in the unknown voltage. When the unknown voltage change is in the opposite direction, the error signal is of the opposite phase. In each case, the error signal causes the means 4 to energize the motor 3 for rotation in a direction corresponding to the phase of the error signal, such direction being that required to so adjust the balancing device 1 as to cause the balancing voltage to be changed in the proper direction to reduce the error signal to zero and hence to rebalance the apparatus.

It is clear from the foregoing that the rebalancing operation of the FIG. 2 apparatus is the same as that described hereinbefore for the FIG. 1 apparatus, except that the error signal in the FIG. 2 apparatus is an A.C. signal of a phase dependent upon the direction of measuring network unbalance, while in the described FIG. 1 apparatus the error signal is a D.C. signal of a polarity dependent upon the direction of measuring network unbalance.

THE BALANCING MEANS OF FIG. 3

In FIG. 3 there are shown the details of means suitable for use as the balancing portion of the apparatus of FIG. 1 or FIG. 2. The FIG. 3 arrangement includes the balancing device 1, the rebalancing motor 3, the rebalancing linkage 7, and the indicating and recording means 8 of the apparatus of FIG. 1 or FIG. 2. Thus, FIG. 3 shows a specific arrangement by which rotation of the rebalancing motor 3 acts through the linkage 7 to change the strain on and the resistance of the resistance wires 9, 10, 11, and 12 collectively, and to change correspondingly, the positions of the pointer 29 and the pen 31 of the means 8. In FIG. 3, as in the figures to follow, components which are the same as or equivalent to ones in other figures bear the same reference numerals in all figures.

In the FIG. 3 arrangement, the resistance wires 9, 10, 11, and 12 are in the form of the known bonded-type of strain gauge elements, which are bonded onto a deflectable member 47. The left-hand end of this member, adjacent the elements 9, 10, 11, and 12, is rigidly mounted at 48 to form a cantilever. The elements 9 and 12 are mounted on the upper surface of the member 47, while the elements 10 and 11 are mounted on the lower surface thereof. Accordingly, upward deflection of the right-hand end of the member 47 increases the tension and resistance of the elements 10 and 11 and decreases the tension and resistance of the elements 9 and 12, while downward deflection of the right-hand end of the member 47 decreases the tension and resistance of the elements 10 and 11 and increases the tension and resistance of the elements 9 and 12. Such deflection of the member 47 is effected by the motor 3 acting on the right-hand end of this member through drive means elements of the linkage 7 which will now be described.

The rebalancing motor 3 has a shaft 49 on which is fixedly mounted a motor pulley 50. The latter drives a belt or cable member 51 which has a portion wrapped around the pulley 50 and which is supported between mounted pulleys 52 and 53. The belt 51, in turn, is wrapped around and drives a second pulley 54 which is fixedly mounted on a shaft 55. Accordingly, rotation of the motor shaft 49 produces corresponding rotation of the pulley 54 and the shaft 55, and lateral motion of the belt 51.

A second belt or cable member 56, forming a part of means coupling the shaft 55 to the member 47, is wrapped around the shaft 55 and is in driven engagement therewith. The belt 56 is supported between the shaft 55 and a mounted pulley 57, and includes a spring 58 which imparts resiliency to the belt 56.

Secured to the belt 56, between the shaft 55 and pulley 57, is the left-hand end of a member 59 which is pivotally mounted at its right-hand end by a cross spring pivot 60. A connecting link member 61 pivotally connects the right-hand end of the member 47 to the member 59 at a point on the latter adjacent the pivot 60.

Accordingly, rotation of the motor shaft 49 in the counterclockwise direction causes upward movement or deflection of the left-hand portion of the member 59 and the right-hand end of the member 47, while rotation of the motor shaft 49 in the clockwise direction imparts a downward motion to the members 59 and 47. It is in this manner that the rotation of the rebalancing motor 3 varies or adjusts the strain on the elements 9, 10, 11, and 12, and correspondingly, the resistance of these elements and the value of the balancing voltage output of the bridge circuit including these elements.

As shown in FIG. 3, the pointer 29 and pen 31 are secured to the belt 51. Therefore, the aforementioned lateral movement of the belt 51 moves or positions the pointer and pen along their respective scale 30 and chart 32 so that an indication and record of the value of the balancing voltage, and hence the unknown voltage, are produced by the means 8.

OPERATION OF THE FIG. 3 MEANS

Upon an increase in the value of the unknown voltage applied between the terminals 5 and 6 of the FIG. 1 or FIG. 2 apparatus, the resulting error signal causes the motor shaft 49 and the pulley 50 in FIG. 3 to begin rotating in the counter-clockwise direction. This rotation causes the belt 51 to move the pointer 29 and the pen 31 up-scale, or to the right in FIG. 3, and produces counter-clockwise rotation of the pulley 54 and the shaft 55. This in turn causes the members 59 and 47 to be deflected in the upward direction, whereby the resistance of the elements 10 and 11 is caused to increase, and that of the elements 9 and 12 is caused to decrease. Such resistance changes cause the balancing voltage in the FIG. 1 or FIG. 2 circuit to increase, as is necessary in the presence of an increased value of the unknown voltage. The foregoing movements and changes continue progressively until balance is once again established, at which time the mechanism comes to rest with the pointer 29 and the pen 31 at a position corresponding to the new, higher value of the balancing and unknown voltages.

Upon a decrease in the unknown voltage from a value at which the apparatus is balanced, the rebalancing operation is the same as that described above, but in the opposite direction. Thus, the motor 3 rotates the shaft 49, the pulley 50, the pulley 54 and the shaft 55 in the clockwise direction, causing the members 59 and 47 to move downwardly. This causes the resistance of the elements 10 and 11 to decrease and that of the elements 9 and 12 to increase, resulting in a progressive decrease in the balancing voltage. Simultaneously, the pointer 29 and the pen 31 are progressively moved downscale. These actions continue until the apparatus is once again back in the balanced condition.

THE BALANCING DEVICE OF FIG. 4

As was mentioned hereinbefore, the resistance wires 9, 10, 11, and 12 of the balancing device 1 may be in the form of bonded strain gauge elements, as in FIG. 3, or may be in the form of unbonded, stretched wire elements. A desirable form of balancing device using such unbonded wire elements is shown in FIG. 4. A portion of this device is also shown in FIG. 6, in combination with a novel measuring circuit network. This balancing device of FIG. 4 is thus a means by which rotation of a shaft, rotated by the rebalancing motor 3, changes the resistance of the stretched wire elements 9, 10, 11, and 12 in a predetermined, desired manner.

Before describing the device of FIG. 4, it is noted that this device per se is the joint invention of John Leyenberger and John D. McGhee, and is disclosed and claimed in their co-pending application filed on even date herewith. Accordingly, the following description treats the FIG. 4 device only to the extent that it constitutes a desirable form of strain-sensitive device for use as the balancing element or device 1 in the apparatus of the present invention.

The FIG. 4 device comprises an elongated, rigid frame member 62 having a cross section in the general form of the letter H. The uppermost portion of the member 62 consists of spaced-apart pillars 63 and 64 of rectangular cross section. A cylindrical member 65 is supported axially by a shaft 66 of cruciform cross section between the pillars 63 and 64, the shaft 66 being shown in FIG. 6.

The shaft 66 is rigidly attached to the pillars 63 and 64 at its ends, and the cylindrical member 65 is rigidly attached to the shaft 66. Accordingly, the member 65 has limited rotational movement in either direction about its axis in a plane perpendicular to this axis and to that of the shaft 66, and perpendicular to the central web of the H-shaped member 62. Such movement thus causes rotational flexure of the shaft 66 about its axis.

The resistance wire elements 9, 10, 11, and 12 are stretched between the cylindrical member 65 and clamping means located at the lower end or base of the frame member 62. In the FIG. 4 view of the device 1, only the element 10 and part of the element 11 are visible, but reference to FIG. 6 shows the relative positions of the elements 9, 10, 11, and 12 on the cylindrical member 65. From these figures it is seen that each of the elements 9, 10, 11, and 12 is in the form of an elongated, U-shaped loop, having its curved end portion in engagement with the cylindrical member 65, and having its other, straight end portion at the lower end of the member 62.

The clamping means for the element 10 at the lower end of the member 62 is shown in FIG. 4 as including a first insulating strip 67, which is fastened to the lower end of the member 62. This clamping means also includes a second insulating strip 68, which is cemented to the strip 67, the lower wire ends of the element 10 being sandwiched and secured in-between the strips 67 and 68. The lower ends of the element 11, not shown in FIG. 4, are also secured between the strips 67 and 68 in the same manner, but to the left of the element 10. Similar means, not shown, are employed for clamping the lower ends of the elements 9 and 12 on the opposite side of the member 62.

The upper, curved or U-shaped ends of the elements 9, 10, 11, and 12 are supported by the cylindrical member 65 by means of respective pins 69, 70, 71 and 72, as shown in FIG. 6. The pin 70, supporting the element 10, is also shown in FIG. 4. Each of these pins is secured in the member 65 and projects from the surface thereof, with the curved end of the respective element looped around the pin. In this way, each of the elements 9, 10, 11, and 12 is supported at its opposite ends by the member 65 and the clamping means 67–68, and is stretched between this member 65 and the means 67–68.

The two wires forming the lower end portion of each of the elements 9, 10, 11 and 12 also constitute the end terminals of the corresponding element. These wire ends are connected to corresponding ones of a plurality of terminals 73 through 79 which are mounted on an insulating member 80 forming the base of the FIG. 4 device 1. The terminals 73 through 79 permit the elements 9, 10, 11, and 12 to be connected into the associated circuitry of FIG. 1 or FIG. 2 previously described, or into the circuitry of FIG. 6 in a manner which will be described specifically hereinafter.

As a result of the construction of the device 1 as described above, the above-mentioned rotation or deflection of the cylindrical member 65 changes the tension in the elements or wires 9, 10, 11, and 12. Specifically, rotation of the member 65 in the counter-clockwise direction as viewed in FIGS. 4 and 6 causes the tension and strain on the wires 10 and 11 to be increased, and causes the tension and strain on the wires 9 and 12 to be decreased. It will be apparent from the previous description of the FIG. 1 apparatus that such motion of the member 65 increases the value of the balancing voltage in the associated circuit, and hence is an up-scale rebalancing action.

Rotation of the member 65 in the opposite or clockwise direction causes the tension and strain on the wires 10 and 11 to be decreased, and causes the tension and strain on the wires 9 and 12 to be increased. Accordingly, such rotation is associated with a down-scale rebalancing action. The elements 9, 10, 11, and 12 are so stretched or tensioned between their above-described end supports that all of these elements are in tension to some degree at all times and for all rotational positions of the member 65.

The foregoing rotational movements of the member 65 are imparted thereto by the rebalancing motor 3 through drive and coupling means of the rebalancing linkage 7 which will now be described. These means include a sector-shaped member 81 which is rigidly secured to the member 65. A spring member 82, located between the sector 81 and the frame 62, urges the sector 81 to the left in FIG. 4 against a stop member 83 which is fastened between the pillars 63 and 64 and which passes through an opening in the sector 81. Accordingly, the device 1 is normally biased into the full up-scale position.

The sector 81 is moved in the down-scale direction, to the right in FIG. 4, when the conditions call for a decrease in the balancing voltage. Such action is effected by the clockwise rotation of a second sector member 84 having a hub portion 85 which is connected to the sector 81 by means of a flexible band 86. The latter passes around the hub 85 and over the top of the sector 81, and has its respective ends fastened to the hub 85 and the sector 81.

The sector 84 is pivotally mounted on an extension 87 of the frame 62, and is rotated by the rotation of an input shaft 88 which is also pivotally mounted on the frame 62. The shaft 88 carries a hub 89 which is in driving engagement with the periphery of the sector 84 through the medium of a flexible band 90. The latter has one end fastened to the hub 89, passes around the latter, and has its other end secured to the sector 84 at 91.

OPERATION OF THE FIG. 4 DEVICE

From the foregoing description it can be seen that counter-clockwise rotation imparted to the shaft 88 causes the device 1 to be actuated in the down-scale direction. Thus, such rotation causes the band 90 to wind up on the hub 89, causing the sector 84 and its hub 85 to rotate in the clockwise direction. This causes the band 86 to wind up on the hub 85. As a result, the band 86 pulls the sector 81 to the right against the force of the spring 82, thereby changing the tension on the elements 9, 10, 11, and 12 in the down-scale direction.

Conversely, rotation of the shaft 88 in the clockwise direction allows the spring 82 to force the sector 81 to the left, thereby causing the device to be actuated in the up-scale direction. Specifically, such rotation of the shaft 88 allows the band 90 to be unwound from the hub 89 by the pull exerted by the counter-clockwise rotation of the sector 84, which rotation, in turn, is produced by the band 86 pulling on the hub 85 as the spring 82 urges the sector 81 to the left.

It is clear from the foregoing that rotation in one direction (clockwise) imparted to the shaft 88 causes the elements 9, 10, 11, and 12 to be actuated, through the several coupling elements, in the upscale direction to increase the balancing voltage, while rotation in the other direction (counter-clockwise) imparted to the shaft 88 causes the elements 9, 10, 11, and 12 to be actuated in the downscale direction to decrease the balancing voltage. Such rotation of the shaft 88 is effected by the corresponding rotation of the shaft 49 of the rebalancing motor 3. A suitable means for causing the rotation of the motor 3 to rotate the shaft 88 of the balancing device 1, and at the same time to position the pointer 29 and the pen 31 of the means 8, will now be described with reference to FIG. 5.

THE FIG. 5 ARRANGEMENT

The FIG. 5 arrangement, by which the motor 3 advantageously adjusts the balancing device 1 of FIG. 4 in the apparatus of FIG. 1 or FIG. 2, or in the apparatus of FIG. 6 and the others to be described hereinafter, includes the device 1, only partially shown, the rebalancing motor 3, also only partially shown, the rebalancing linkage 7, and the indicating and recording means 8. The linkage 7 includes the motor shaft 49, the motor pulley 50, the belt 51 supported by the pulleys 52 and 53, the second pulley 54, now driving the input shaft 88 of the device 1, and other components to be described hereinafter. As in FIG. 3, the indicating and recording means 8 includes the pointer 29, the scale 30, the pen 31, and the chart 32, the pointer 29 and pen 31 being positioned by the belt 51 as before. In FIG. 5, the chart 32 is shown supported by a chart roll 92. The elements 1, 3, etc. are supported by a box-like member 93 which defines a so-called rebalancing module for the apparatus of FIG. 1 or FIG. 2.

The motor shaft 49 drives the motor pulley 50 in FIG. 5 by means of suitable gears 94, 95, and 96. This permits the rebalancing speed of the apparatus to be changed as desired, such changes being accomplished by changing the sizes of the gears. The pulley 50 is supported for rotation on the member 93 in driven engagement with the gear 96. The latter in turn is driven by the gear 95, which is also supported for rotation on the member 93. Finally, the gear 95 is driven by the gear 94, which is fixedly mounted on the motor shaft 49.

The motor pulley 50 drives the second pulley 54 by means of the belt 51 as in FIG. 3, except that the FIG. 5 arrangement includes additional mounted pulleys 97 and 98 supporting the belt 51. These pulleys are supported relative to the member 93 by means not shown in FIG. 5.

The pulley 54 in turn adjusts the device 1 by being fixedly mounted on the input shaft 88 of the latter. As will be remembered from the description of the FIG. 4 device 1, rotation of the shaft 88 deflects the cylindrical member 65 through the coupling elements 89, 90, 84, 85, 86 and 81, and hence adjusts the resistance of the elements 9, 10, 11, and 12 and the value of the balancing voltage in the associated measuring network.

OPERATION OF THE FIG. 5 ARRANGEMENT

As will be apparent from the foregoing description, the rotation of the balancing motor 3 adjusts the elements 9, 10, 11, and 12 of the FIG. 4 device 1, and hence the value of the balancing voltage, in a direction corresponding to the direction of such rotation. For example, an increase in the value of the unknown voltage in the associated measuring network produces an error signal which causes the motor shaft 49 and its gear 94 to rotate in the clockwise direction in FIG. 5. The gear 94 then drives the gear 95 counter-clockwise, causing the latter to drive the gear 96 and the motor pulley 50 in the clockwise direction. This in turn causes the belt 51 to move the pointer 29 and the pen 31 up-scale, or to the right in FIG. 5, and to drive the second pulley 54 and the shaft 88 in the clockwise direction. As was explained hereinbefore, such clockwise rotation of the shaft 88 causes the elements 9, 10, 11, and 12 to be actuated in the up-scale direction to increase the balancing voltage, as is needed in the example being described.

A decrease in the unknown voltage from a value at which the apparatus is in balance causes the foregoing elements to operate in the opposite direction to decrease the balancing voltage. Thus, the motor 3 then drives the gear 94, and hence the shaft 88, counter-clockwise, thereby actuating the elements 9, 10, 11, and 12 in the downscale direction. In each such rebalancing operation, the described rotations continue until the changing balancing voltage has reduced the resulting error signal to zero once more.

It is apparent from the foregoing that the rotation of the rebalancing motor 3 in FIG. 5 adjusts the unbonded FIG. 4 elements 9, 10, 11, and 12 in a manner which is similar in its over-all aspects to that in which the motor 3 adjusts the bonded elements 9, 10, 11, and 12 in the FIG. 3 apparatus. In each case, the balancing voltage is changed in a direction corresponding to the direction of rotation of the motor 3. However, it is also apparent that the specific means by which such motor rotation effects such balancing voltage changes in FIGS. 4 and 5 is quite different from that shown in FIG. 3.

THE APPARATUS OF FIG. 6

In FIG. 6 there is shown in detail a desirable form of self-balancing measuring apparatus following the basic circuit of FIG. 1 or FIG. 2 but employing the specific balancing device 1 of FIG. 4. The FIG. 6 apparatus also embodies and illustrates the details of a novel measuring circuit network having features which cooperate with those of the FIG. 4 balancing device 1 to provide an arrangement according to the present invention which admirably fulfills the several objects set forth hereinbefore.

As previously noted, the elements 9, 10, 11, and 12 of the balancing device 1 are shown in FIG. 6 in their wire loop form of FIG. 4, and are shown in engagement with the deflectable member 65 whose deflection changes their tension and hence their resistance. FIG. 6 also shows the connection of the lower wire ends of the elements 9, 10, 11, and 12 to their respective element terminals 73 through 79, and additionally shows the interconnection of these terminals to form a balancing bridge circuit for the balancing device 1.

By way of example, the FIG. 6 apparatus is shown as one which is arranged to measure and record the output voltage, and hence the temperature, of a thermocouple 99. Therefore, the FIG. 6 apparatus is a D.C. measuring one. However, in other figures to be described hereinafter, there are shown modifications of the FIG. 6 apparatus which are arranged for connection to other input devices, such as resistance thermometer elements.

In addition to the device 1, the FIG. 6 apparatus includes the power supply 2, of an improved D.C. form to be described hereinafter, the rebalancing motor 3, and the input terminals 5 and 6, now forming a part of a cold junction compensating device 100 to be described hereinafter. The thermocouple 99 is connected between the input terminals 5 and 6, whereby its compensated output voltage is compared with the balancing voltage of the device 1 to form the error signal of the apparatus.

Also included in the FIG. 6 apparatus are the rebalancing linkage 7, through which the motor 3 deflects the member 65, and the indicating and recording means 8. These may well be of the form shown in FIG. 5. There is also included a damping and filtering circuit 101, and a unit 102 including an amplifying and motor driving means. The unit 102 may be of the general type of the device 4 employed in the circuit of FIG. 1, in which case the unit 102 may advantageously have the specific form shown in FIG. 8 and to be described hereinafter. Alternatively, the unit 102 may be of the form of the unit 37 of FIG. 2, in which case the unit 102 may advantageously have the specific form shown in FIG. 15 and to be described hereinafter. For the purpose of simplifying the present description, however, it will be assumed for this description that the unit 102 is of the form shown in FIG. 8, and hence that the FIG. 6 apparatus is of the general form shown in FIG. 1.

The unit 102 has input terminals 103, 104, and 105, and has output terminals 106 and 107. In the specific example being described, the terminals 103 and 104 are the amplifier input terminals, and hence correspond to the terminals 25 and 26 of FIG. 1. It is to the terminals 103 and 104 that the error signal is applied in FIG. 6. The terminal 105 is a reference terminal, as will be explained hereinafter in connection with the detailed description of the FIG. 8 arrangement.

The output terminals 106 and 107 are connected to the motor 3 to supply to the latter the rotation-controlling current produced by the unit 102 in response to the applied error signal. The motor 3 is shown in FIG. 6 as being of the two-phase type disclosed in the aforementioned Wills patent and hence as having a control winding 108, a power winding 109, and a rotor 110. The winding 108 is connected between the output terminals 106 and 107, while the winding 109 is energized through a condenser 111 from the source of alternating current to which the energizing conductors 27 of the unit 102 are connected. The rotor 110 drives the linkage 7, by being connected to the motor shaft 49 of FIG. 5, for example. The manner in which the rotor 110 is driven in one direction or the other in response to a D.C. error signal of one or the opposite polarity, respectfully, at the terminals 103 and 104 is the same as that described in the aforementioned Wills patent for the motor shown therein.

BALANCING BRIDGE CIRCUIT

Turning now to the bridge circuit of the device 1 and the associated measuring circuit network, it is seen that the upper input or energizing terminal of the bridge is now formed by the contact 34 of the zero-adjusting resistor 33, the ends of the latter being connected to the elements 9 and 10 at the respective element terminals 73 and 77. The contact 34 is connected by the conductor 20 to the bridge supply terminal 18. The resistor 33 serves in FIG. 6 the same zero or suppression adjusting purpose that it serves in FIG. 1, but its circuit location in FIG. 6 results in a desirable linear relationship between rotation of the knob 35 and the shifting of the zero point of the apparatus.

A further advantage of the FIG. 6 circuit location for the resistor 33 is that this location avoids contacting problems which are inherent when the resistor 33 is connected as in FIG. 1. Specifically, the FIG. 6 location dictates that the resistance of the resistor 33 be relatively low, which in turn permits the resistor 33 to be formed of a single turn of resistance wire. This avoids those contacting problems which result when the resistor 33 must have a relatively high resistance, and hence must have its resistance wire wound in convolutions, as occurs with the FIG. 1 connections.

Additionally, the FIG. 6 connections of the resistor 33 cause a potential to be developed between the contact 34 and the body of the resistor 33 should a poor contact between these two parts tend to develop. This potential is high enough to cause the immediate reestablishment of a good contact between the contact 34 and the resistor body, as is desired. Further comments on the use of the resistor 33 will be made hereinafter in connection with the description of the other range-determining components of the apparatus.

As before, the other energizing terminal for the bridge circuit is the terminal 14 between the elements 11 and 12 at the element terminal 76. This terminal is connected by the conductor 21, in series with resistors 112, 113, and 114, to the supply terminal 19. The resistor 112 is in particularly good thermal relationship with the elements 9, 10, 11, and 12 for a purpose to be hereinafter described. This thermal relationship is indicated by the dashed line enclosure 115. The purpose of the resistors 113 and 114 will also be described hereinafter.

Also as before, one output terminal of the balancing bridge circuit is the terminal 15 between the elements 9 and 11, this terminal being connected to the element terminals 74 and 75. In FIG. 6 however, the other bridge output terminal is the junction 118 between series connected resistors 116 and 117 connecting the element terminals 78 and 79. The purpose of the resistors 116 and 117 will be explained hereinafter.

It is noted that the device 1 is so constructed that, if the resistors 116 and 117 were eliminated, and the terminals 78, 79, and 118 were directly connected together, there would be zero bridge output voltage between the terminals 15 and 118 for the center-scale condition or position of the member 65 and the elements 9, 10, 11, and 12, assuming that the contact 34 were positioned midway along the resistor 33.

RANGE DETERMINING MEANS

The balancing bridge output voltage between the terminals 15 and 118 must be modified in order to form the balancing voltage for comparison with the voltage to be measured. Such modification is necessary, as in the case of the FIG. 1 arrangement, in order to permit the apparatus to operate with the desired values of span and suppression, and hence the desired range. This balancing voltage, adjusted for the desired values of span and suppression, is produced between the contact 23 and the element terminal 79 at the lower end of the resistor 117, as will be clear from the following explanation.

In FIG. 6, the span resistor 22 is connected between the bridge output terminals 15 and 118 in series with a resistor 119, and provides a vernier adjustment of the apparatus span. The basic value of this span is determined in FIG. 6 by the resistance of a resistor 120 connected in parallel with the series resistors 22 and 119. The value of the resistor 120 is so chosen as to cause the apparatus to have the desired span when the contact 23 is approximately at its mid position along the resistor 22. The value of the resistor 119 determines the amount by which the basic span can be changed by adjustment of the contact 23.

The value of the resistor 117, connected between the bridge output terminal 118 and the balancing voltage terminal 79, and the adjustment of the contact 34 on the zero resistor 33, jointly determine the amount of suppression in the FIG. 6 apparatus; that is, the number of measuring units, such as millivolts, by which the electrical zero of the apparatus is displaced or shifted from the lowest point on the scale 30. The basic magnitude of this shift is dependent upon the value of the resistor 117, while the exact amount is determined by the position of the contact 34 along the resistor 33. The contact 34 thus provides a vernier adjustment of the apparatus suppression.

In the circuit shown in FIG. 6, the suppression provided by the resistor 117 may be positive, zero, or negative, depending upon the value of this resistor. Positive suppression is a shift of the electrical zero down-scale from the low end of the scale, while negative suppression is a shift of the electrical zero in the up-scale direction. For zero suppression, the electrical zero is at the lowest point on the scale. In each case, the exact value of the suppression is set by the adjustment of the contact 34, once the type and basic amount of suppression have been determined by the value of the resistor 117.

The resistor 116 serves to compensate for the presence of the resistor 117 insofar as the midscale output of the bridge circuit is concerned. Specifically, for any chosen value of the resistor 117, the value chosen for the resistor 116 is that which causes the bridge output between the terminals 15 and 118 to be zero when the member 65 and the elements 9, 10, 11, and 12 are in the center scale condition or position.

It should be readily apparent from the foregoing description that the balancing voltage between the contact 23 and the terminal 79 is the balancing bridge output voltage adjusted or modified by the values or positions of the span resistor 120 and span contact 23, and of the suppression resistor 117 and contact 34, as necessary to cause the apparatus to have the desired operating range.

COMPARISON CIRCUIT

The unknown input voltage from the thermocouple 99 between the input terminals 5 and 6, as corrected by the device 100 as explained below, is compared with the balancing voltage between the contact 23 and the terminal 79 to form the error signal which is applied to the terminals 103 and 104. To this end, these two voltages are connected in series opposition between the terminals 103 and 104 in the comparison portion of the measuring circuit network of the apparatus. Specifically, the measuring input terminal 5 is connected through a cold junction resistor 121 and a conductor 122 to the balancing voltage terminal 79, while the other balancing voltage terminal, contact 23, is connected by a conductor 123 to the input terminal 104. Finally, the remaining input terminal 103 is connected through elements of the filtering and damping circuit 101 to the remaining measuring input terminal 6. As in the FIG. 1 circuit, the polarities of the unknown and balancing voltages in this series comparison circuit are such that these voltages oppose each other between the terminals 103 and 104.

FILTERING AND DAMPING CIRCUIT

The aforementioned filtering and damping circuit 101 includes in series, between the measuring input terminal 6 and the amplifier input terminal 103, an adjustable damping resistor 124, an inductance 125 shunted by a tuning condenser 126, and a resistor 127. The junction between the resistor 124 and the inductance 125 is connected by a condenser 128 and a reference conductor 129 to the bridge output terminal 79. The conductor 129 is also connected to the reference terminal 105 of the unit 102. A condenser 130 connects the junction of the inductance 125 and the resistor 127 to the reference conductor 129, and a condenser 131 connects the input terminal 103 to the reference terminal 105. This completes the filtering and damping circuit 101.

One purpose of the circuit 101 as just described is to prevent stray signals, picked up in the thermocouple 99 and/or in the measuring circuit, the device 1, etc., from reaching and affecting the unit 102, and hence from affecting the operation of the motor 3. This filtering action, which is produced in the general manner described in the aforementioned Wills patent, is enhanced in the present circuit by the presence of the tuned inductance 125, which presents a high, blocking impedance to stray signals, such as those at sixty c.p.s., while presenting only a desirably low impedance to the error signal.

A second purpose of the circuit 101 is to provide a damping or anti-hunting action on the motor 3 to prevent the rebalancing mechanism from over-shooting the balance point as the latter is approached in each rebalancing operation. The manner in which such a damping action is produced by a circuit of the type of the circuit 101 is fully described in the Harrison et al. Reissue Patent No. 23,121, and need not be explained further herein.

Since the amount of the damping action which the circuit 101 provides is dependent upon the resistance value of the resistor 124, the manual adjustment of the latter, as by the knob 132, changes the amount of damping obtained. Such adjustment is desirable to permit the response of the apparatus to be varied to suit the particular requirements of different applications.

THE COLD JUNCTION DEVICE OF FIGS. 6 AND 7

The aforementioned cold junction assembly or device 100 is provided to compensate for the changes in the total thermocouple output voltage which result, in the known manner, from changes in the temperature of the reference or cold junction of the thermocouple 99. Such temperature changes are usually the result of changes in the ambient temperature to which the apparatus is exposed. The device 100, shown schematically in FIG. 6 as including the input terminals 5 and 6 and the resistor 121, will now be described in detail with reference both to FIG. 6 and to FIG. 7, wherein are shown the essential structural details of the device 100.

As is well known, the magnitude of the total output voltage of a thermocouple, such as the thermocouple 99, depends upon the difference between the temperatures of its hot and cold junctions. Therefore, since it is the temperature of only the hot junction which is actually to be measured by the FIG. 6 apparatus, means, such as the device 100, must be provided to make the net thermocouple voltage, which is the unknown voltage actually measured by the apparatus, dependent solely upon the hot junction temperature, and independent of the temperature of the cold junction.

Such compensation is effected in the FIG. 6 apparatus by constructing the device 100 so that the thermocouple cold or reference junction exists in the device 100, and by providing at this junction a temperature sensitive resistor, the resistor 121, which is at the same temperature as the cold junction. This resistor is so connected in the associated measuring circuit that it effectively modifies the total thermocouple voltage as necessary to compensate for changes in this voltage resulting from changes in the temperature of the cold junction, and thus as necessary to keep the net, measured thermocouple voltage a function of solely the temperature of the hot junction.

Figure 7:
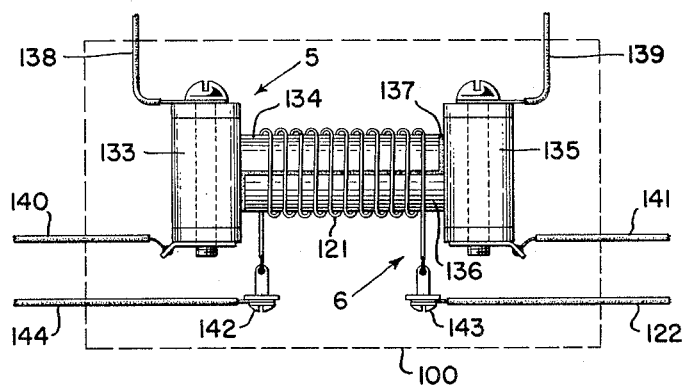
FIG. 7 is a pictorial representation of the cold junction assembly portion of the FIG. 6 apparatus.

To the end of causing the cold junction of the thermocouple 99 to be formed in the device 100 so that the temperature of this junction can be sensed conveniently and accurately, the terminals 5 and 6 are made relatively massive and of a material having good thermal conductivity. As shown in FIG. 7, the terminal 5 is generally T shaped, having a cylindrical contact portion 133 and an elongated portion 134. Similarly, the terminal 6 has a contact portion 135 and an elongated portion 136. The portions 134 and 136 are symmetrically disposed in good heat transfer relationship with each other, whereby the terminals remain at the same temperature, which is prevented from changing rapidly by the mass of the terminals. In other words, the terminal structure forms a heat sink which minimizes the effects of temperature transients. The portions 134 and 136 are electrically insulated from each other, however, by insulation 137 as shown in FIG. 7.

The legs or lead wires 138 and 139 of the thermocouple 99 are connected to the respective terminals 5 and 6 at the respective portions 133 and 135, to which are also connected the respective conductors 140 and 141 leading to the rest of the measuring circuit. By virtue of this construction, the junctions between the thermocouple wires 138 and 139 and the respective terminals 5 and 6, of a dissimilar material, stay at the same temperature, no matter how this temperature may vary. Similarly, the junctions between the circuit wires 140 and 141, of one material, and the respective terminals 5 and 6, of said dissimilar material, have the same temperature as that of the thermocouple-terminal junctions. The result of this is that all junctions between dissimilar materials in the device 100 are held at the same temperature.

Additionally, all junctions throughout the circuit connected between the conductors 140 and 141, external to the device 100, are such that changes in the temperature to which the circuit is exposed do not produce any thermal E.M.F.'s between the ends of the conductors 140 and 141 in the device 100. This is achieved by the use of such known techniques as employing heat sinks and symmetrical disposition for dissimalar material junctions through said circuit. Junctions in the circuit between the same material can, of course, be allowed to vary in temperature without generating any thermal E.M.F.

As a result of the foregoing construction, there is zero thermal E.M.F. developed between the terminals 5 and 6 by the FIG. 6 apparatus. Accordingly, the thermocouple leads 138 and 139, which are connected to these terminals, respectively, are effectively connected together from the thermal standpoint, thus forming the cold or reference junction of the thermocouple 99. Since the thermocouple cold junction is thus formed entirely within the device 100, its temperature can conveniently and accurately be sensed for compensating purposes.

Such sensing of the temperature of the structure of the terminals 5 and 6, and hence of the thermocouple cold junction, is accomplished by making the temperature of the temperature-sensitive resistor 121 the same as that of the terminals 5 and 6. To this end, the temperature-sensitive resistance wire forming the resistor 121 is electrically insulated wire wound directly onto the spool-like structure formed by the juxtaposed portions 134 and 136 of the terminals. As shown in FIG. 7, the ends of the wire of the resistor 121 terminate at terminals 142 and 143, by means of which the resistor 121 is connected to the conductors 122 and 144 of the FIG. 6 measuring circuit.

In order to make the changes in the temperature, and hence the resistance, of the resistor 121 compensate for thermocouple voltage changes produced by said temperature changes, means are provided in the FIG. 6 circuit for passing a known current through the resistor 121. This means includes resistors 145 and 146 which are connected in a series circuit with the resistor 121 between the bridge energizing contact 34 and terminal 14. Specifically, this circuit can be traced from the contact 34 through the resistor 145, the conductor 144, the resistor 121, the conductor 122, and the resistor 146 to the terminal 14. The potential supplied to the bridge circuit between the contact 34 and the terminal 14 by the supply 2 causes a current to flow through the resistor 121 which produces across the resistor a voltage drop of a magnitude dependent upon the resistance of this resistor, and hence upon the temperature of the thermocouple cold junction. This current is kept substantially constant in a manner to be described hereinafter.

As was mentioned hereinbefore, the resistor 121 is also connected in series with the thermocouple 99 and the balancing voltage in the series comparison circuit between the terminals 103 and 104. Therefore, the above-mentioned temperature-dependent voltage drop produced across the resistor 121 is included in this comparison circuit. As mentioned hereinbefore, this voltage drop compensates for that part of the total thermocouple voltage in the comparison circuit which is due to a changed temperature of the thermocouple cold junction. The result of this is that the net thermocouple voltage which is left to be compared with the balancing voltage is dependent solely on the temperature of the thermocouple hot or measuring junction, as is desired.

The cold or reference junction compensating device 100 and its manner of connection in the FIG. 6 circuit provide several important operating advantages over previously known compensating arrangements. For example, the fact that the device 100 contains no separate, added thermoelectric junction of its own as the cold junction, but instead uses as the cold junction the junctions which are produced by the main thermocouple leads themselves, makes a single form of the device 100 universally usable with any thermocouple, no matter what its composition. It is only necessary initially to select the values of the resistors 145 and 146 so as to give the desired current flow through the resistor 121 for the particular composition of thermocouple being used.

THE CONTROL MEANS OF FIG. 6

If desired, the FIG. 6 apparatus can be provided with control means to permit the apparatus to effect desired control functions in response to the value of the quantity being measured, such as the temperature of the thermocouple 99. For example, it may be desirable to have such control means actuate an alarm when the temperature to which the thermocouple 99 is exposed reaches a predetermined value. Alternatively, it may be desired to arrange such control means to control the application of heat to the space containing the thermocouple 99, thereby to cause the FIG. 6 apparatus to control the temperature of said space. Such addition of control means to a self-balancing measuring instrument is shown in the aforementioned Wills patent.

An example of the manner in which such control means can be incorporated in the apparatus of the present invention is shown in FIG. 6. In this figure, an illustrative control means 147 is shown as being actuated by the linkage 7, and hence actuated in accordance with the measured voltage and temperature of the thermocouple 99. The means 147 is shown as including an elongated slidewire resistor 148 having a pointer contact 149 and control index contacts 150 and 151. The contact 149 is adjusted along the resistor 148 by the linkage 7 in synchronism with the pointer 29 and pen 31, and hence is positioned in accordance with the measured value of the temperature being measured.

Each of the index contacts 150 and 151 is arranged to be adjusted manually along the resistor 148, as by means of a respective one of index knobs 152 and 153. If desired, the contacts 150 and 151 may be provided with individual pointers, not shown, for cooperation with the scale 30, or a similar scale, in order to facilitate the adjustment of these index contacts to the desired control point positions along the resistor 148.

The control means 147 is arranged to provide a corresponding, discrete control action whenever the pointer contact 149 is moved by the linkage 7 into alignment with a corresponding one of the index contacts 150 and 151. To this end, the resistor 148 is made to have a voltage drop between its ends, as by means of a battery 154. The input of a corresponding one of voltage or current responsive relays 155 and 156 is connected between the contact 149 and a respective one of the contacts 150 and 151. These relays may be electromagnetic, electronic, etc., and each of them is constructed to close or open an internal circuit between its control terminals, 157 or 158, whenever its input falls to a predetermined value.

Consequently, the relay 155 produces this control action or operation between its terminals 157 whenever the pointer contact 149 is driven into alignment with the index contact 150, and the input to the relay 155 is consequently reduced to said predetermined value. Therefore, this action is produced whenever the measured value of the thermocouple voltage becomes substantially equal to the value represented by the existing control point position of the index contact 150. The same operation occurs for the relay 156 whenever the contact 149 is moved into alignment with the index contact 151.

If desired, the relays 155 and 156 may be polarized relays, so that the above control actions occur only on one side of the control point established by the position of the corresponding index contact. If this is done, it is possible, for example, to have the internal circuit of the relay 155 between the terminals 157 closed as long as the contact 149 is below, or to the left of, the contact 150, and to have the relay 155 open this circuit whenever the contact 149 is aligned with or above the contact 150. Such a control circuit can be used in the known manner to control the temperature of the space in which the thermocouple 99 is located simply by including the terminals 157 in series in the circuit to the means which supplies heat to said space.

Control means for use with the FIG. 6 apparatus need not, of course, be of the form shown by way of example in FIG. 6. Instead, such control means may be of any of the known types, such as contact control, air control, etc. Moreover, even if such means is of the general form shown in FIG. 6, it could have more or fewer index contacts than the two shown in FIG. 6, or could use one or more of such contacts to provide electric proportioning control instead of the on-off control described by way of example. The specific type of control means to be used in the FIG. 6 apparatus in practice should be the type best suited for the particular application in question.

THERMOCOUPLE BURNOUT INDICATION

The FIG. 6 apparatus includes means for causing the pointer 29 to provide a positive indication of thermocouple failure or burnout should this condition occur. This means includes a resistor 159 which is shown as being connected between the supply conductor 20 and the thermocouple or input terminal 6 at the conductor 141.

Upon open-circuiting of the thermocouple 99 external to the terminals 5 and 6, as by burnout of the thermocouple, or upon an abnormal increase in the resistance of the thermocouple, indicative of incipient failure, the resistor 159 applies to the unit 102 a burnout signal which appears to the unit 102 as an up-scale error signal. The pointer 29 is thus driven in the up-scale direction by the motor 3, but since the changing balancing voltage is in this instance ineffective to reduce this error signal, due to the resulting interruption of the series comparison circuit, the pointer 29 is driven to and held at the upper limit of its travel. This provides a positive indication of the fact that the thermocouple has failed.

For apparent reasons, the described connection of the resistor 159 is referred to as the up-scale burnout connection. This connection is particularly advantageous in those cases where the FIG. 6 apparatus effects control actions as described hereinbefore.

If it is desired to have the pointer 29 driven in the down-scale direction upon thermocouple failure, it is only necessary to connect the burnout resistor 159 from the terminal 6 to the bridge energizing terminal 14 instead of to the conductor 20. This connection will provide so-called down-scale burnout indication.

THE UNIT OF FIG. 8

There is shown in FIG. 8 the details of a specific form which the unit 102 of FIG. 6 may desirably take. As explained hereinbefore, the purpose of this unit is to receive the reversible polarity D.C. error signal of relatively small magnitude applied between the input terminals 103 and 104, and to produce from this signal, between the output terminals 106 and 107, a reversible phase motor driving signal for driving the motor 3.

The specific form and circuitry chosen for the unit 102 of FIG. 8 are substantially the same as those of the converting, amplifying, and motor driving section of measuring apparatus shown and claimed in the Cilyo Patent No. 2,832,924. Thus, the unit 102 includes a converting portion 160 having a synchronous switch or D.C. to A.C. chopper 161 and an input transformer 162 which are of the type of the chopper 17 and transformer 23 shown in said Cilyo patent. These components are also, in turn, of the type described in the aforementioned Wills patent.

The unit 102 also includes a transistorized A.C. amplifying portion or circuit 163 which is the same as the amplifier 3 of said Cilyo patent except as noted hereinafter, a transistorized motor driving portion or circuit 164 which is practically identical to the motor drive circuit 4 of said Cilyo patent, and a power supply portion 165 which is the practical equivalent of the power supply of said Cilyo patent, and which energizes the portions 160, 163, and 164.

Further, as in said Cilyo patent, the amplifying portion or amplifier 163 includes transistors 166, 167, 168, and 169 connected in a four stage common-emitter configuration. Also, the output of the last of these stages is coupled and matched to the motor drive portion 164 by a transformer 170 of the type of the Cilyo patent transformer 82. Finally, as in the Cilyo patent, the motor drive portion 164 includes a transistor 171 connected in a common emitter circuit in order to obtain a high power gain. This transistor controls the supply of output or motor drive current to the control winding 108 of the motor 3, which is connected between the output terminals 106 and 107.

The power supply portion 165 includes a power transformer 172 having a primary winding 173 which is energized from the supply conductors 27, and having secondary windings 174, 175, 176, 177, and 178. The windings 175 and 176 are connected to and cooperate with diode rectifiers 179 and 180, resistors 181, 182, and 183, and filter condensers 184, 185, and 186 to form a conventional, filtered D.C. power supply circuit for the amplifier 163. The windings 177 and 178 are connected to and cooperate with diode rectifiers 187 and 188 to form a conventional D.C. supply circuit for the motor drive portion 164.

The chopper 161 has an operating winding 189 which is connected to and energized from the transformer winding 174, and which vibrates a movable contact 190 into alternate engagement with stationary contacts 191 and 192 in the manner described hereinbefore for the switch or chopper 36 of the FIG. 2 apparatus. The input transformer 162 has a center-tapped primary winding 193, and has a secondary winding 194 which is connected to the input of the amplifier 163. The error signal input terminal 103 is connected through a resistor 195 to the movable chopper contact 190, while the cooperating contacts 191 and 192 are connected to the respective end terminals of the primary winding 193. The center-tap of the latter is connected to the input terminal 104, thus completing the internal circuit between the input terminals 103 and 104.

In the manner described in the aforementioned Cilyo and Wills patents, the application of a D.C. error signal to the terminals 103 and 104 produces across the secondary winding 194 an A.C. error signal, of the frequency of the supply voltage to which the conductors 27 are connected, which is either in phase with, or 180 degrees out of phase with, the supply voltage, depending upon the polarity of the D.C. error signal. This A.C. error signal is then amplified by the amplifier 163 and controls the transistor 171 in its regulation of the motor driving current.

In the amplifier 163, the input transformer secondary winding 194 is included in the input or base-emitter circuit of the first stage transistor 166. The base of the latter is biased by means of resistors 196 and 197, which connect this base between respective positive and negative supply conductors 198 and 199. These conductors are, in turn, energized from the above-described power supply circuit of the portion 165, the conductor 199 also being the reference conductor of the apparatus.

An emitter resistor 200 connects the emitter of the transistor 166 to the positive conductor 198, while this emitter is connected to the negative conductor 199 by condensers 201 and 202. A collector resistor 203 connects the collector of the transistor 166 to the conductor 199.

The base of the second stage transistor 167 is coupled to the collector of the preceding transistor 166 by a condenser 204, and is biased by resistors 205 and 206 which connect this base to the respective conductors 198 and 199. An emitter resistor 207 connects the emitter of the transistor 167 to the conductor 198, while this emitter is connected by a condenser 208 to the conductor 199. A collector resistor 209 connects the collector of the transistor 167 to the conductor 199.

The base of the third stage transistor 168 is biased by resistors 210 and 211, which connect this base to a positive supply conductor 212 and to the negative supply conductor 199, respectively. A condenser 213 couples the collector of the preceding transistor 167 to a point which is adjustable along the resistor 210, thereby providing a gain adjustment for the amplifier. An emitter resistor 214 connects the emitter of the transistor 168 to the conductor 212, while this emitter is connected by a condenser 215 to the conductor 199. A collector resistor 216 connects the collector of the transistor 168 to the conductor 199.

The fourth stage transistor 169 is directly coupled to, and hence is biased by, the preceding stage, and has its emitter connected to the conductor 212 through an emitter resistor 217. This emitter is also connected to the conductor 199 through a condenser 218. The collector load for this transistor is the primary winding 219 of the aforementioned coupling transformer 170. A condenser 220 is connected across the winding 219.

It should be apparent that the amplifier 163 as just described is essentially the same as that shown at 3 in the Cilyo patent, except for the manner of coupling and biasing the several stages. Thus, instead of being directly coupled as in the Cilyo patent circuit, the first two stages are condenser coupled in the amplifier 163. While this necessitates biasing the second stage independently of the first stage, it permits the first stage transistor 166 to be operated at relatively low collector current, as is desirable to raise the input impedance and current gain of this stage, which would not normally give the proper bias for the second stage if direct coupling were employed. Condenser coupling is also employed between the second and third stages of the amplifier 163 in order to prevent the bias on the third stage from being disturbed by the second stage.

Since the third stage transistor 168 is biased independently, it is possible to provide direct coupling between the third and fourth stages, as shown, without producing the undesirable effect of leaving the fourth stage bias affected by the second stage. This differs from the coupling in the Cilyo patent circuit wherein the third and fourth stages must be indirectly coupled because of the direct coupling between the second and third stages.

The motor drive circuit 164 is identical to the circuit 4 of the Cilyo patent except for the inclusion in the circuit 164 of an emitter resistor 221. Thus, the input circuit to the transistor 171 includes the secondary winding 222 of the transformer 170 and the resistor 221 connected in series between the transistor base and emitter. The output circuit for this transistor extends from the collector to the output terminal 107, through the motor control winding 108 to the terminal 106, and through the appropriate portion of the power supply 165 and the resistor 221 to the emitter. The resistor 221 performs the usual function of providing current stabilization and raising and stabilizing the A.C. input of the motor drive circuit. A resistor 223 connected between the transistor collector and base, and a condenser 224 connected across the output terminals 106 and 107, perform the same functions as described in the Cilyo patent for the identical components therein.

In the manner described in the Cilyo patent, the unit 102, in response to the application of an error signal between the terminals 103 and 104, produces a motor drive signal between the output terminals 106 and 107. This drive signal will be either in phase with or 180° out of phase with the supply voltage of the conductors 27, depending upon whether the error signal is of one or the opposite polarity. Thus, the applied error signal causes the unit 102 to energize the motor 3 for rotation in a direction corresponding to the error signal polarity.

It was noted in connection with FIG. 6 that the reference conductor 129 of the measuring circuit is connected to the terminal 105 of the unit 102. In the latter, this terminal is connected to the reference conductor 199, whereby a common reference conductor extends throughout the apparatus. The cores and shields of the various transformers and the chopper in the unit 102 are connected to this reference conductor. The latter is not connected to ground, but is permitted to float in potential with respect to ground as dictated by the stray potentials to which the apparatus may be subjected.

The casing 225 of the unit 102, as well as the structure of the device 1, and that housing the supply 2 and the measuring circuit network, are connected together and through a resistor 226 to the reference conductor 199 in the unit 102. Accordingly, this casing and structure tend to float at the same potential as the apparatus reference conductor. This freedom of the reference conductor and casing structure to float in potential above ground minimizes the effects on the apparatus operation of stray potentials existing between the thermocouple and measuring circuit conductors and ground.

The resistor 226 is used to prevent the casing 225 and connected structure from becoming dangerously alive with respect to ground should the thermocouple 99 or other means connected to the reference conductor 129 become so alive. Also for safety purposes, the control winding circuit of the motor 3 is arranged to be grounded, as by the ground connection 227 to the output terminal 107, as is the structure of the motor 3. Such grounding of the motor control winding without effecting the grounding of the apparatus reference conductor is made possible by electrically isolating the circuit of the motor drive portion 164 from the remainder of the unit 102 circuit, as is apparent from FIG. 8.

THE FIG. 9 POWER SUPPLY

Figure 9:
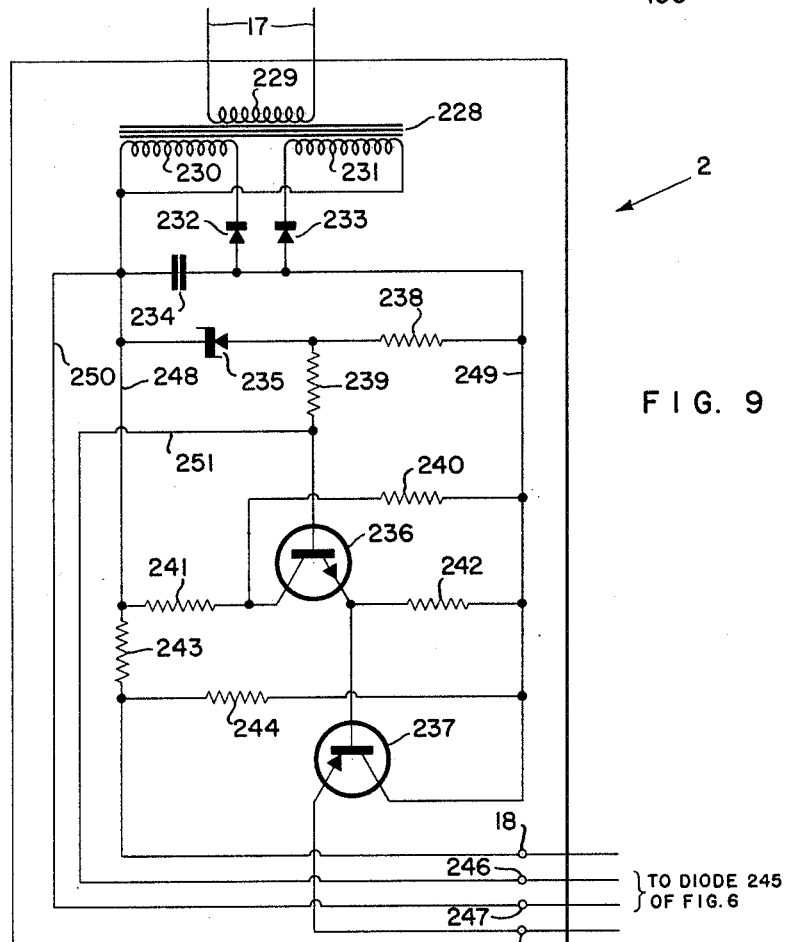
FIG. 9 is a circuit diagram of a power supply suitable for use in the apparatus of FIG. 6.

The circuit of FIG. 9 is one which may desirably be used as the balancing bridge power supply 2 of the FIG. 6 apparatus. As will become apparent as the present description proceeds, the characteristics of this circuit and the elements responsible for them co-operate and coact with the characteristics of the balancing device 1 and the components of the measuring circuit network of FIG. 6 to cause the accuracy of the measurements made by the apparatus to be virtually unaffected by changes in the ambient temperature. The FIG. 9 circuit is also designed to supply the balancing bridge circuit and the cold junction compensating circuit with substantially constant energization, notwithstanding variations in the supply voltage of the supply conductors 17.

The power supply circuit 2 of FIG. 9 includes a power transformer 228, having a primary winding 229 and secondary windings 230 and 231, diode rectifiers 232 and 233, a filter condenser 234, a Zener diode 235, transistors 236 and 237, and resistors 238 through 244. The supply 2 also includes a second Zener diode 245 which is maintained in good thermal association with the resistor 112 and the balancing device 1, and which is therefore shown only in FIG. 6, where it is seen to be located within the enclosure 115. This diode 245 is connected to the remainder of the supply 2 through terminals 246 and 247, and serves both a regulating and a temperature compensating purpose as will be explained below.

The transformer primary winding 229 is connected to and energized from the supply conductors 17. The secondary windings 230 and 231 cooperate with the rectifiers 232 and 233 to produce across the condenser 234, between supply conductors 248 and 249, a full-wave rectified D.C. energizing voltage. The polarity of this voltage is such that the conductor 248 is positive with respect to the conductor 249. The diode 235 is connected in series with the resistor 238 between the conductors 248 and 249, and the junction between these elements is connected through the resistor 239 to the base of the transistor 236, which, as shown, is of the NPN type. This base is also connected to the negative conductor 248 by the diode 245 of FIG. 6, by way of conductors 250 and 251 and the terminals 246 and 247.

The emitter of the transistor 236 is connected to the negative conductor 249 by the resistor 242. The collector of this transistor is connected to the junction between the resistors 240 and 241, these resistors being connected in series between the conductors 248 and 249.

The transistor 237, which is of the PNP type, as shown, has its base directly connected to the emitter of the preceding transistor 236, and has its collector directly connected to the negative conductor 249. The emitter of the transistor 237 forms one output terminal of the supply 2, and is connected to the output terminal 19. The other output terminal 18 is connected to the junction between the resistors 243 and 244 which are connected in series between the conductors 248 and 249. Thus, the output circuit of the supply 2 can be traced from the last mentioned junction to the terminal 18, through the external load of the FIG. 6 measuring circuit and back to the terminal 19, and through the emitter-collector path of the transistor 237 to the negative conductor 249.

As will be apparent from the foregoing description, the Zener diodes 235 and 245 form a cascaded, two-stage voltage regulator including the resistors 238 and 239. The output of this regulator is a stable reference voltage which is used to control the transistor 236. The latter regulates the transistor 237 which, in turn, regulates the energizing voltage and current supplied to the FIG. 6 load.

To this end, the reference voltage output of the Zener regulator is applied between the base and collector of the transistor 236, forming the control bias on the latter. The resistors 240 and 241 form a voltage divider for this transistor to limit its collector-emitter voltage to its rated value. This divider also provides a high impedance source which causes the voltage across the transistor to drop as the transistor current increases. This action, in turn, reduces the required wattage rating of the transistor 236, and also helps to stabilize its response to temperature changes.

The transistor 236 operates as an emitter follower to control the bias on the succeeding transistor 237. Thus, the emitter resistor 242 of the transistor 236 is connected in the base-collector or input circuit of the transistor 237. The latter is also operated in an emitter-follower configuration, with the external measuring circuit of FIG. 6 forming the emitter load. The resistors 243 and 244 form a voltage divider which places the voltage drop across the resistor 243 in series with the transistor output between the output terminals 18 and 19. Therefore, the variations in this voltage drop, produced by A.C. supply voltage changes, tend to offset the transistor output voltage changes produced by these same supply voltage changes, whereby the effect of such changes on the output voltage of the supply 2 between the terminals 18 and 19 are minimized.

The effect on the FIG. 9 circuit of the actions of the transistors 236 and 237 in response to temperature changes is minimized by the illustrated use of the two opposite types of transistors. Specifically, the emitter-base voltage across each of these transistors rises as its temperature rises, in substantially the same manner for both transistors. Further, these two voltages are essentially connected in series between the reference voltage output of the Zener diode circuit and the output of the supply 2. Since the voltage across the NPN transistor 236 is opposite in polarity to the voltage across the PNP transistor 237 in this series circuit, the above changes in these voltages with temperature substantially cancel each other. Therefore, the use of the two different types of transistors in the FIG. 9 circuit minimizes the effect on its output voltage of changes in the temperatures of the two transistors, making this voltage substantially independent of the temperature of the transistors.

The degree to which this cancelling action for the two transistors is effective depends, of course, upon the degree to which the two transistors are maintained at the same temperature. Accordingly, it is desirable to heat sink the two transistors to the same sink.

As a result of the foregoing circuitry and construction, the output voltage between the terminals 18 and 19 is for all practical purposes unaffected by variations in the supply voltage between the supply conductors 17, or by variations in the temperature of the transistors 236 and 237. However, this output voltage is purposely caused to vary in a predetermined manner with variations in the ambient temperature in order to effect an ambient temperature compensating action now to be described. It is noted that this output voltage variation with ambient temperature is obtained by the action of the Zener diode 245.

AMBIENT TEMPERATURE COMPENSATION

The need for a balancing bridge energizing voltage which varies with changes in ambient temperature in order to maintain the balancing voltage, and hence the apparatus accuracy, independent of ambient temperature, stems from a particular characteristic of the type of balancing device and bridge circuit shown in FIGS. 4 and 6. Thus, it has been found that with such a device, for any given position of the member 65, and with an energizing voltage of constant value applied between the energizing terminals 34 and 14, a rise in ambient temperature produces a decrease in the magnitude of the bridge output voltage. In other words, the balancing bridge circuit exhibits a negative temperature coefficient of voltage. Since such changes in bridge output voltage occur without any corresponding changes in the position of the member 65, it is clear that this characteristic of the device 1, if not compensated, would result in measuring errors being produced by ambient temperature changes.

In the present description, the term ambient temperature refers particularly to the temperature of the device 1 and the other measuring circuit components and strucure, as well as to the temperature of the surrounding air.

In order to provide ambient temperature compensation for the balancing bridge circuit, therefore, it is necessary to provide a bridge energizing voltage which increases with ambient temperature just sufficiently to offset the effects of the temperature coefficient of the circuit. That is, the energizing voltage must be made to change with ambient temperature at the same rate that the bridge circuit output voltage changes with ambient temperature. In other words, the bridge energizing voltage must be made to have a positive voltage coefficient equal to the negative voltage coefficient of the bridge circuit.

It has been found in this connection that the specific device 1 of FIGS. 4 and 6, constructed as described in the aforementioned application of Leyenberger and McGhee, exhibits between the bridge input terminals 34 and 14 a varying resistance as the ambient temperature varies. Specifically, it has been found that this resistance increases with ambient temperature, and hence that the bridge circuit exhibits a positive temperature coefficient of resistance.

Moreover, it has been found that the value of this positive resistance coefficient of the bridge circuit is substantially equal to the value of the above negative voltage coefficient of the bridge circuit. This means that the bridge circuit produces a fixed number of millivolts output per milliampere of bridge energizing current for any given position of the member 65, this number being independent of the ambient temperature. This means further that the value of the balancing voltage can be made independent of the ambient temperature, as is desired, by arranging the apparatus to maintain a constant current through the balancing bridge circuit: that is, a current which does not vary with ambient temperature.

In view of the foregoing, it is seen that the value of the energizing voltage for the balancing bridge circuit must be made to vary with ambient temperature in such a manner as to keep constant the energizing current passing through the bridge circuit, in order to make the balancing voltage independent of the ambient temperature. Specifically, this requires that the energizing voltage increase in a predetermined manner as the ambient temperature increases, and that this voltage decrease in a predetermined manner as the ambient temperature decreases, these voltage changes being those necessary to maintain the energizing current constant.

In order to cause the bridge energizing voltage to vary with the temperature of the device 1 in the above-described manner, use is made of the inherent temperature sensitivity or positive temperature coefficient of the Zener diode 245. As is known, the regulated voltage across such a diode increases as the diode temperature increases. Therefore, by placing the diode 245 in good heat transfer relationship with the device 1, as shown in FIG. 6, the output voltage of the supply 2 is made to increase as the temperature of the device 1 increases, and vice-versa, as is desired.

It has been found in practice, however, that the above temperature coefficient of the diode 245 is generally larger than that of the bridge circuit, whereby the above voltage-varying action of the diode 245 alone would actually produce an undesired increase in bridge circuit current for an increase in temperature. This over-correcting tendency of the diode 245 is compensated for by the action of the aforementioned resistor 112, which is connected in series in the bridge energizing conductor 21.

In order to produce the above compensating action, the resistor 112 is made to have a suitable positive temperature coefficient of resistance, and is maintained at the temperature of the diode 245 and the device 1 as indicated by the enclosing dashed line 115 in FIG. 6. It has been found to be desirable in practice to insure that the resistor 112 and the diode 245 are held at the same temperature, and that this combination is held at the temperature of the device 1. As a result, an ambient temperature increase produces an increase in the resistance of the resistor 112 which partly offsets the effect of the supply voltage increase produced by the diode 245 for such a temperature increase. The value and temperature coefficient of the resistor 112 are so chosen as to cause the amount of said resistance increase to be that required to offset the tendency of the diode 245 to increase the bridge circuit energizing current. Therefore, this current, which flows through the resistor 112, is caused to remain substantially constant throughout the range of ambient temperatures normally encountered in practice.

The purpose of the resistor 113, which also is connected in series in the bridge energizing conductor 21, is to permit the bridge energizing current to be set to the desired constant value for the particular diode used as the diode 245. This resistor desirably has a substantially zero temperature coefficient of resistance, and its resistance value determines the value of the bridge energizing current.

The aforementioned resistor 114, which also is connected in series in the bridge energizing conductor 21, is provided for the purpose of making it possible to have a standard value of load on the supply 2, for a particular temperature, for different combinations of the values of the resistors 116, 117, 145, and 146. In practice, once the desired values of these four resistors have been determined, the resistance of the resistor 114 is made to be that which will, at the chosen standard temperature, cause the total load on the supply 2, between the terminals 18 and 19, to have a certain, predetermined standard value which is the same from instrument to instrument.

The resistor 114, as well as the resistors 33 and 120, are desirably made to have the same temperature coefficient of resistance as that exhibited by the balancing bridge circuit, so that the entire load on the supply 2 will have this coefficient. Further, the resistors 33, 114, and 120 are arranged to be kept at the same temperature as the device 1 and its bridge circuit. The resistors 22 and 119, however, do not need to have any specific temperature coefficient, although they should have as nearly the same coefficient as possible, and the coefficient should be as low as possible.

The voltage drops across the resistors 116 and 117 should be substantially independent of the ambient temperature. This is achieved in the FIG. 6 circuit by making these resistors have a substantially zero temperature coefficient of resistance, since the current which flows through these resistors is the bridge circuit current which, in turn, is held substantially constant as explained hereinbefore. Therefore, the physical location of these resistors is not important from the thermal standpoint.

It was noted hereinbefore that the supply 2 causes a substantially constant current to flow through the cold junction compensating circuit resistors 145, 112 and 146 at all times. In order to have this current remain constant and be independent of the ambient temperature, in the face of a supply voltage between the conductors 20 and 21 which varies with temperature as explained above, the risistors 145 and 146 are desirably made to have the same temperature coefficient of resistance as that of the resistor 114, and to be maintained at the same temperature as this resistor and the bridge circuit.

OPERATION OF THE FIG. 6 APPARATUS

The operation of the FIG. 6 apparatus in effecting its rebalancing action upon changes in the temperature of the hot junction of the thermocouple 99 should be readily apparent in the light of the foregoing description of this apparatus, together with the descriptions of the balancing device of FIG. 4, the rebalancing mechanism of FIG. 5, the amplifier of FIG. 8, the power supply of FIG. 9, and the basic form of the entire apparatus of FIG. 1. It is deemed to be sufficient to note herein, therefore, that an increase in the temperature of the thermocouple 99, to a value above that at which the FIG. 6 apparatus is balanced, causes the production, between the terminals 103 and 104, of an error signal of such a polarity that the unit 102 produces between the output terminals 106 and 107 a motor drive current of such a phase that the rotor 110 of the motor 3 is caused to rotate in the clockwise direction. This in turn causes the pulleys 50 and 54 and the shaft 88 in FIG. 5 to rotate in the clockwise direction, with the result that the members 81 and 65 rotate counterclockwise, or to the left, in FIG. 6.

Such rotation of the member 65 causes the tension and resistance of the wires 10 and 11 to increase, and the tension and resistance of the wires 9 and 12 to decrease. As a result, the value of the balancing voltage increases between the terminals 23 and 79, and the value of the error signal decreases, as long as the motor 3 is operating. Such operation terminates when the error signal has been reduced substantially to zero, at which time the belt 51 will have positioned the pointer 29 and the pen 31 to indicate the new, higher value of the thermocouple voltage, and the apparatus will have been returned to the balanced condition.

TYPICAL VALUES

By way of illustration and example, and not by way of limitation, the following table lists a set of related typical values or other characteristics which various ones of the components and quantities of a particular instrument of the type shown in FIGS. 6 through 9 may have in practice. The particular values given are those for an instrument having a range of 0–200° F. and for use with a type J thermocouple. This range corresponds to a span of 5.793 millivolts and a supression of −0.887 millivolts for a cold junction temperature of 32° F.

Resistors:

| Resistor No. | Value in ohms @87.5° F. | Temperature coefficient in ohms/ohm/° F. |
| --- | --- | --- |
| 9, 10, 11, 12 | 634.7 each [1] | +0.000133. |
| 22 | 2000 | Low as possible. |
| 33 | 8 | +0.000133. |
| 112 | 226.5 | +0.0021. |
| 113 | 240 | 0. |
| 114 | 137.2 | +0.000133. |
| 116 | 1.313 | 0. |
| 117 | 1.305 | 0. |
| 119 | 10K | Same as resistor 22. |
| 120 | 36.09 | +0.000133. |
| 121 | 10 | +0.0021. |
| 124 | 50K | not critical. |
| 127 | 22K | Do. |
| 145 | 5074.5 | +0.000133. |
| 146 | 5011.7 | +0.000133. |
| 159 | 100 Meg | not critical. |
| 238 | 7K | Do. |
| 239 | 10K | Do. |
| 240 | 15K | Do. |
| 241 | 2.7K | Do. |
| 242 | 22K | Do. |
| 243 | 27.5 | Do. |
| 244 | 7470 | Do. |

[1] At midscale.

Condensers (values in microfarads):
  111 _____ 1.0
  126 _____ 0.005
  128 _____ 0.5
  130 _____ 0.5
  131 _____ 0.5
  234 _____ 300

Other items:
  Transistor _____ 236
  Transistor _____ 237
  Diode _____ 235
  Diode _____ 245
  Inductance _____ 125
  Voltage of _____ 230
  Voltage of _____ 231
  Voltage _____ 18–19
  Type _____ 2N647
  Type _____ 2N378
  Type _____ 1N728
  Type _____ 1N725
  1000 _____ Henrys
  47 v. _____ (nominal)
  47 v. _____ (nominal)
  28 v. _____ (nominal)

THE APPARATUS OF FIG. 10

As was mentioned hereinbefore, the FIG. 6 apparatus can readily be modified so as to adapt it for the measurement of variables other than the output of a thermocouple. One such modification is shown in FIG. 10, wherein the apparatus shown is one which is arranged to measure the value of a simple variable D.C. voltage or millivoltage, such as the output of a tachometer, pyrometer, or the like.

The FIG. 10 apparatus differs from that of FIG. 6 in that the cold junction device 100 and the associated resistors 145 and 146 are dispensed with, as is the burn-out resistor 159. As a result, the input terminal 5 is directly connected by the conductor 122 to the balancing voltage terminal 79, thereby placing the input or unknown voltage to be measured directly in series opposition with the balancing voltage between the unit 102 input terminals 103 and 104. Aside from this difference, the construction and operation of the FIG. 10 apparatus are the same as those described above for the FIG. 6 apparatus.

As was mentioned hereinbefore, the resistor 117 in the FIG. 6 circuit provides any desired type of suppression when connected as shown in FIG. 6. The reason for this is that the cold junction resistor 121 in FIG. 6 introduces into the comparison circuit a relatively large positive voltage drop which is greater than any negative voltage which the thermocouple 99 can produce under normal conditions. In the FIG. 10 circuit, however, where there is no such cold junction resistor, the illustrated circuit connections of the resistor 117 provide only positive, zero, or negative suppressions up to 50% of the coexisting apparatus span. To obtain an amount of negative suppression greater than 50% of the coexisting span, however, it is only necessary to use the element terminal 78, at the upper end of the resistor 116, as the one balancing voltage terminal in lieu of the element terminal 79. When this is done, the roles of the resistors 116 and 117 are interchanged, the value of the resistor 116 now determining the basic value of the suppression, and the resistor 117 compensating for the resistor 116 to give zero bridge circuit output at midscale. Thus, the circuit of FIG. 10 permits any desired value and type of apparatus suppression to be obtained simply by the selection of the value of the resistor 117 or 116, and the selection of the proper element terminal as the balancing voltage terminal.

THE APPARATUS OF FIG. 11

In FIG. 11 there is shown another modification of the FIG. 6 apparatus which is arranged to measure and record the resistance value of a resistor 252. In practice, this resistor may well be a resistance thermometer element having a desired temperature coefficient of resistance, and being exposed to a temperature which is to be measured by the apparatus. It will be assumed for convenience of description that this is the case with the FIG. 11 apparatus, and that the latter is calibrated in terms of temperature. What the FIG. 11 apparatus actually does is to maintain an element energizing current flow through the resistor 252, and to measure the resulting element voltage drop across this resistor as a measure of its resistance and temperature. As for the FIG. 10 apparatus, the FIG. 11 apparatus does not require or include the cold junction compensating components of FIG. 6, since there is no thermocouple associated with the FIG. 11 apparatus.

The measurement of the element voltage drop across the element 252 is effected by comparing this voltage drop to the balancing voltage to form the error signal for application to the unit 102. To this end, the FIG. 11 apparatus includes the FIG. 6 balancing device 1 with its wires 9, 10, 11, and 12. The balancing bridge circuit in FIG. 11 is somewhat different from the bridge circuit of FIG. 6, however, because of the use of a different source of the voltage to be measured. Thus, the upper input or energizing terminal of the FIG. 11 bridge is the terminal 13, as in the FIG. 1 arrangement, which is connected directly to the wires 9 and 10 through the respective element terminals 73 and 77. The other bridge input terminal is the terminal 14, as in both the FIG. 1 and the FIG. 6 arrangements.

In the FIG. 11 bridge circuit, the zero resistor 33 is connected in series with the resistor 116 between the element terminals 78 and 79, whereby the resistor contact 34 forms one of the bridge output terminals. The resistors 116 and 33 together in series perform the function performed by the resistor 116 alone in FIG. 6, while the resistor 33 performs its usual zero adjusting purpose.

The element terminal 75 alone in FIG. 11 forms the other of the bridge output terminals, the terminal 75 no longer being directly connected to the terminal 74. Instead, the suppression resistor 117 is now connected between the terminals 74 and 75, making the terminal 74 one of the balancing voltage terminals. As before, the span resistors 22, 119, and 120 are connected between the bridge output terminals, making the contact 23 the other of the balancing voltage terminals. However, in the FIG. 11 bridge circuit, the positions of the span resistors 22 and 119 are interchanged in their series circuit because of the shift of the one balancing voltage terminal from the right-hand bridge terminal 79 to the left-hand terminal 74.

In order to provide the aforementioned energizing current flow through the element or resistor 252, the FIG. 11 apparatus includes element energizing terminals 253 and 254 which, together with the element input terminals 5 and 6, are connected externally of the apparatus to the element 252. Specifically, the latter has four leads, leads 255 and 256 extending from one end of the element 252 to the respective terminals 253 and 6, and leads 257 and 258 extending from the other end of the element 252 to the respective terminals 254 and 5. Accordingly, the FIG. 11 apparatus is of the so-called four-wire resistance thermometer type. It is through leads 255 and 257 that the aforementioned element energizing current is caused to flow.

Specifically, the terminal 254 is connected through a resistor 259 and a conductor 260 to the supply conductor 20, while the terminal 253 is connected through a resistor 261, a conductor 262, and the resistor 114 to the supply conductor 21. As a result, the supply 2 causes an element energizing current to flow through the element 252.

The element voltage drop produced across the element 252 by the above current flow appears between the measuring leads 256 and 258, and hence between the terminals 5 and 6, and is applied to the unit 102 input terminals 103 and 104 in series opposition to the balancing voltage. Specifically, the element input terminal 6 is connected, as before, through the filtering and damping circuit 101 to the unit input terminal 103, while the unit input terminal 104 is connected by the conductor 123 to the balancing voltage terminal 23. The other balancing voltage terminal 74 is connected by the conductor 122 to the other element input terminal 5, thus completing the series comparison, error signal-producing circuit.

It is noted that the FIG. 11 bridge and element energizing voltage need not be regulated as it must be in FIG. 6, just as long as the voltage across the bridge input changes in the same manner as the voltage across the element energizing resistors 259 and 261, as occurs in the FIG. 11 circuit. Thus, any increase, for example, in the supply voltage between the conductors 20 and 21 produces both an increase in the balancing voltage and a corresponding increase in the element voltage drop, which increases effectively cancel each other. For this reason the Zener diode 245 is not needed, and is replaced in the FIG. 11 apparatus by a simple resistor 263 connected between the terminals 246 and 247 of the supply 2.

In order to compensate for the fall-off of the bridge circuit output voltage with increased ambient temperature, however, it is desirable to cause the resistors 259 and 261 to have the same temperature coefficient of resistance and the same temperature as the bridge circuit, as in the case of the resistors 145 and 146 of FIG. 6. When this is done, any decrease in the bridge output voltage due to an ambient temperature increase is offset by a corresponding decrease in the voltage drop across the element 252. This latter decrease results from the corresponding increase in resistance and decrease in current flow of the resistors 259 and 261 produced by said ambient temperature increase.

Aside from the differences described above, the FIG. 11 apparatus is essentially the same as that of FIG. 6. Thus, assuming a positive temperature coefficient for the resistance thermometer element 252, an increase in the temperature to which this element is exposed, to a value above that at which the apparatus is balanced, causes an increase in the element voltage drop above the existing balance value. This in turn causes the production of an error signal, between the unit 102 input terminals 103 and 104, of such a polarity as to cause the motor 3 to drive the device 1 in the up-scale direction to increase the bridge output and balancing voltages, and hence to decrease the error signal. This action continues until the error signal has been reduced substantially to zero, at which time the apparatus will have been rebalanced, and the pointer and pen will have been moved up-scale to a new position corresponding to the increased temperature, resistance, and voltage-drop of the element 252.

THE APPARATUS OF FIG. 12

In FIG. 12 there is shown still another modification of the FIG. 6 apparatus which is the same as that of FIG. 11 except for being designed for use with the so-called three-wire type of resistance thermometer element. Accordingly, in FIG. 12, the element input terminal 6 is directly connected to the element energizing terminal 253 within the apparatus, and only the lead 255 is connected to the upper end terminal of the element 252. Further, a resistor 264 is connected from the bridge circuit energizing terminal 14 to the conductor 129, which is connected to the element input terminal 5. Aside from these differences, the FIG. 12 apparatus is constructed and operative in the same manner as the FIG. 11 apparatus.

The purpose of the resistor 264 is to minimize the effect on the apparatus measuring accuracy of variations in the resistance of the leads connected to the element 252, specifically the resistance of the combination measuring and energizing lead 255. Such variations, which occur, for example, when the lengths of the element leads are changed, cause corresponding variations in the voltage drop produced in the lead 255 by the flow therethrough of the element energizing current. This varying voltage drop appears in the series measuring circuit between the terminals 5 and 6. In the absence of the resistor 264, this varying voltage drop would introduce measuring errors, since there would be no concurrently varying voltage drop in the other measuring lead 258 or anywhere else which would offset the drop in the lead 255. The reason for this is that there would be no compensating current flow through the lead 258 or elsewhere in the measuring circuit if the resistor 264 were not provided.

The resistor 264 provides such a compensating current flow through the lead 258 by being connected in a compensating path in parallel to the element energizing path. Specifically, this compensating path can be traced from the energizing terminal 14 through the conductor 262, the resistor 264, the measuring lead 258, the energizing lead 257, the resistor 259, and the conductor 260 back to the other energizing terminal 13. The normal element energizing path can be traced from the energizing terminal 14 through the conductor 262, the resistor 261, the combination lead 255, the element 252, the energizing lead 257, the resistor 259, and the conductor 260 back to the other energizing terminal 13.

In order to secure the desired compensating action, the compensating current which is caused to flow through the measuring lead 258 must produce therein a voltage drop which is substantially equal and opposite, in the series measuring circuit, to the aforementioned voltage drop in the lead 255. Since the resistances of these two leads are usually substantially equal, and usually change by the same amount as the element lead length is changed, the desired equality between the two voltage drops is obtained by causing substantially equal currents to flow through the leads 255 and 258, and hence through the above two paths. Since the resistance of the element 252 is relatively low, the above current equality can be achieved in practice by making the two resistors 261 and 264 substantially identical.

In the FIG. 12 apparatus, a change in element lead length and resistance causes a change in the voltage drop in the lead 258 which desirably just compensates for the change in the voltage drop in the lead 255 produced by said change in lead length. As a result, the latter change has substantially no effect on the measuring circuit.

THE MODIFICATIONS OF FIGS. 13 AND 14

Figure 13:
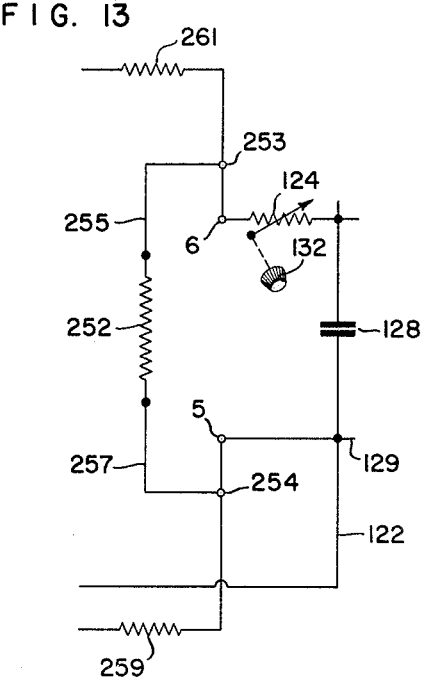
FIGS. 13 and 14 are circuit diagrams of modified forms of a portion of the FIG. 11 apparatus useful for different connections to the resistance to be measured.

FIG. 13 shows a modification of the FIG. 11 apparatus for use in those cases where a so-called two-wire connection to the resistance thermometer element 252 is to be used, and where the resistance of the element 252 is not unduely high. In the FIG. 13 circuit, the element 252 has but two leads, each of which serves as both an energizing and a measuring lead. As a result, the terminals 253 and 6 are directly connected together within the apparatus, as are the terminals 5 and 254.

Figure 14:
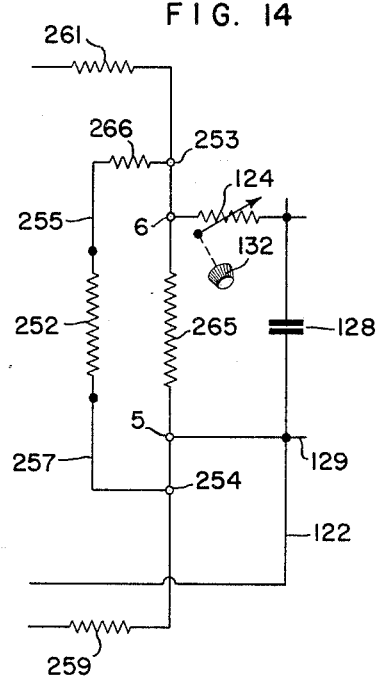

The modification of FIG. 14 is a two-wire arrangement similar to that of FIG. 13 but arranged for use where the resistance of the element 252 is so high as to require impractically high values for the resistors 259 and 261 if the FIG. 13 circuit is used. In the FIG. 14 circuit, a resistor 265 is connected between the measuring input terminals 5 and 6, and a resistor 266 is connected between the terminal 253 and the lead 255. These resistors cause the apparatus input resistance to be reasonably low notwithstanding the relatively high resistance of the element 252, and should have substantially no temperature coefficient of resistance.

THE MODIFICATION OF FIG. 15

As was mentioned hereinbefore in connection with FIG. 6, the apparatus thereof may be of the alternate comparison type of FIG. 2 instead of being of the type of the FIG. 1 apparatus as assumed throughout the FIG. 6 description. If the FIG. 6 apparatus is to follow the form of the FIG. 2 apparatus, the unit 102 may advantageously take the form shown in FIG. 15. The unit shown in this figure is the same as that shown in FIG. 8 except that the input and conversion portion 160 of the FIG. 15 unit follows the form of the unit 37 of FIG. 2 instead of the form of FIGS. 1 and 8.

To this end, the FIG. 15 unit 102 includes the FIG. 2 coupling condenser 46 in lieu of the FIG. 8 input transformer 162. Specifically, the unknown voltage input terminal 103 is connected to the contact 191 of the synchronous switch 161, while the balancing voltage input terminal 104 is connected to the switch contact 192. The reference input terminal 105 is connected to the conductor 199. The movable switch contact 190 is connected through the condenser 46 to the upper end terminal of an input resistor 267, the lower end terminal of which is connected to the conductor 199. A resistor 268 is connected between the terminals 103 and 104.

As a result of the foregoing connections, the operation of the switch 161 causes an A.C. error signal to be produced across the resistor 267, this resistor forming both the output of the measuring network and the input of the amplifying portion 163. This error signal, which is the equivalent of that produced across the secondary winding 194 in the FIG. 8 apparatus, or of that produced between the terminals 25 and 26 in the FIG. 2 apparatus, will have a magnitude and phase which are respectively dependent upon the extent and direction of unbalance between the unknown and balancing voltages.

The A.C. error signal across the resistor 267 is coupled to the input of the first stage transistor 166 through an RC network including condensers 269 and 270, the resistor 197, and a resistor 271. Specifically the upper end terminal of the resistor 267 is connected through the condensers 269 and 270 to the base of the transistor 166, while the junction between these two condensers is connected through the resistor 271 to the conductor 199. In this way, the error signal is caused to control the rotation of the rebalancing motor 3 as described hereinbefore in connection with FIGS. 6 and 8. It is noted that the form of apparatus in FIG. 15 and the type of comparison effected thereby are useful in those applications where it is necessary or at least desirable to omit the input transformer 162 of the FIG. 8 type of apparatus.

CONCLUSION

It is readily apparent in the light of the foregoing description that the present invention provides novel self-balancing measuring, recording, and controlling apparatus which employs a strain-sensitive device as the balancing element, and which employs novel measuring circuitry and associated arrangements designed to cause the balancing and measuring operations to be carried out with a desirably high degree of accuracy, notwithstanding changes in the ambient temperature or in the supply voltage which energizes the apparatus. Moreover, the use of the strain-sensitive device as the balancing element provides apparatus which is free from the undesirable effects encountered when slide-wire resistor or other previously known types of balancing devices are employed. Further, this freedom is achieved without the introduction of new disadvantages stemming from the use of the new type of balancing device. Thus, this apparatus and the accuracy of its measurements are characterized by a freedom from the effects of physical position, vibration, atmospheric conditions and compositions, and rough handling. As a result, this apparatus is characterized by being of simple and rugged construction, by requiring a minimum of maintenance, and by exhibiting a high degree of freedom from malfunctioning and failure. Moreover, the use of the strain-sensitive balancing device results in stepless rebalancing, and hence in a high degree of measuring accuracy. Additionally, since the strain-sensitive type of balancing device has no moving contact, there can be no calibration error due to contact wear. This absence of a moving contact also permits the attainment of high rebalancing speeds of magnitudes which are unattainable in practice with the slide-wire type of balancing device, since, with no moving contact, there is no contact bounce or inertia, and no thermal E.M.F.'s or triboelectric effects due to contact friction.

What is claimed is:

1. Self-balancing measuring apparatus, comprising a balancing device including four strain-sensitive resistors electrically connected as the arms of a bridge circuit and a positionable member mechanically coupled to said resistors to cause the strain thereon to be dependent upon the position of said member, movement of the latter in a given direction causing the strain on one diagonally disposed pair of said resistors to increase and the strain on the other diagonally disposed pair of said resistors to decrease simultaneously, said bridge circuit having a pair of input terminals adapted to be connected to a source of bridge energizing voltage and having a pair of output terminals between which there is produced a balancing voltage of a value dependent upon the position of said member, a pair of measuring terminals adapted to be connected across a source of a voltage of a value to be measured, an amplifier having an input connected between a pair of input terminals and having a pair of output terminals, a comparison circuit in which one of said bridge circuit output terminals is connected to one of said measuring terminals, in which the other of said measuring terminals is connected to one of said amplifier input terminals, and in which the other of said bridge circuit output terminals is connected to the other of said amplifier input terminals to apply said balancing voltage and said voltage to be measured in opposed polarity comparative relation to said input of said amplifier to produce an error signal therein, said amplifier producing between its said output terminals an amplified version of said error signal of a value related to the difference between said balancing voltage and said voltage to be measured, an electric motor having a winding connected to said amplifier output terminals and having a shaft mechanically coupled to said member for repositioning the latter in response to said error signal in the direction and to the extent required to reduce said error signal substantially to zero and hence to establish a condition of balance between said balancing voltage and said voltage to be measured, and exhibiting means coupled to said member and responsive to the position thereof, the value exhibited by said exhibiting means for said condition of balance being a measure of the value of said voltage to be measured, wherein said measuring terminals and the connections thereto are so constructed and arranged that there is substantially zero thermal E.M.F. developed between said measuring terminals, wherein said source of said voltage to be measured is a thermocouple having its leads connected between said measuring terminals, the connection of the leads of the thermocouple to said measuring terminals causing the reference junction of the thermocouple to be formed between the leads at the point of juncture with said measuring terminals, wherein a temperature-sensitive compensating resistor is included in said comparison circuit and is arranged to be maintained at substantially the same temperature as said measuring terminals, and wherein energizing means are connected to said resistor for causing a substantially constant current to flow therethrough, the resulting voltage drop across said resistor in said comparison circuit effectively modifying the total voltage produced between said measuring terminals by the thermocouple, so as to leave for comparison with said balancing voltage in said amplifier input an opposing voltage representative of solely the temperature of the hot junction of the thermocouple.

2. Apparatus as specified in claim 1, wherein said balancing device tends to cause said balancing voltage to decrease as the temperature of said device increases, wherein said source includes compensating means responsive to said temperature to cause said energizing voltage to increase as said temperature increases so as to maintain said balancing voltage substantially independent of said temperature, and wherein said energizing means for said compensating resistor include at least one temperature sensitive resistor which is responsive to said temperature and is connected between said bridge circuit input terminals and said compensating resistor to maintain said current flow therethrough independent of said temperature.

3. Self-balancing measuring apparatus, comprising a balancing device including four strain-sensitive resistors electrically connected as the arms of a bridge circuit and a positionable member mechanically coupled to said resistors to cause the strain thereon to be dependent upon the position of said member, movement of the latter in a given direction causing the strain on one diagonally disposed pair of said resistors to increase and the strain on the other diagonally disposed pair of said resistors to decrease simultaneously, said bridge circuit having a pair of input terminals and a pair of output terminals, said device being characterized in that the application of a constant voltage to said input terminals produces between said output terminals a balancing voltage of a value which varies both as the position of said member and the temperature of said device vary, supply means for applying to said input terminals a voltage which varies with said temperature so as to cause the value of said balancing voltage to be determined solely by the position of said member, a pair of measuring terminals adatped to be connected across a source of a voltage of a value to be measured, an amplifier having an input connected between a pair of input terminals and having a pair of output terminals, a comparison circuit in which one of said bridge circuit output terminals is connected to one of said measuring terminals, in which the other of said measuring terminals is connected to one of said amplifier input terminals, and in which the other of said bridge circuit output terminals is connected to the other of said amplifier input terminals to apply said balancing voltage and said voltage to be measured in opposed polarity comparative relation to said input of said amplifier to produce an error signal therein, said amplifier producing between its said output terminals an amplifier version of said error signal of a value related to the difference between said balancing voltage and said voltage to be measured, an electric motor having a winding connected to said amplifier output terminals and having a shaft mechanically coupled to said member for repositioning the latter in response to said error signal in the direction and to the extent required to reduce said error signal substantially to zero and hence to establish a condition of balance between said balancing voltage and said voltage to be measured, and exhibiting means coupled to said member and responsive to the position thereof, the value exhibited by said exhibiting means for said condition of balance being a measure of the value of said voltage to be measured and being substantially independent of said temperature, wherein said supply means includes compensating means responsive to said temperature to cause a current which is substantially constant and independent of said temperature to flow through said bridge circuit between its said input terminals, wherein a suppression resistor is connected in said bridge circuit to cause said constant current to flow through said suppression resistor, and wherein the resulting voltage drop across said suppression resistor modifies said balancing voltage to provide a desired amount of suppression in the apparatus.

4. Self-balancing measuring aparatus, comprising a balancing device including four strain-sensitive resistors electrically connected as the arms of a bridge circuit and a positionable member mechanically coupled to said resistors to cause the strain thereon to be dependent upon the position of said member, movement of the latter in a given direction causing the strain on one diagonally disposed pair of said resistors to increase and the strain on the other diagonally disposed pair of said resistors to decrease simultaneously, said bridge circuit having a pair of input terminals and a pair of output terminals, supply means arranged to supply an energizing voltage to said input terminals, said device being characterized in that the application of said energizing voltage to said input terminals produces between said output terminals a balancing voltage of a value which varies as the position of said member, the value of said energizing voltage, and the temperature of said device vary, a pair of measuring terminals adapted to be connected across a resistance element, energizing means for causing a current to flow through said element, the resulting voltage drop across said element appearing between said measuring terminals and varying with the resistance of said element and with the value of said current, said voltage drop constituting a voltage of a value to be measured by the apparatus, an amplifier having an input connected between a pair of input terminals and having a pair of output terminals, a comparison circuit in which one of said bridge circuit output terminals is connected to one of said measuring terminals, in which the other of said measuring terminals is connected to one of said amplifier input terminals, and in which the other of said bridge circuit output terminals is connected to the other of said amplifier input terminals to apply said balancing voltage and said voltage drop in opposed polarity comparative relation to said input of said amplifier to produce an error signal therein, said amplifier producing between its said output terminals an amplified version of said error signal, an electric motor having a winding connected to said amplifier output terminals and having a shaft mechanically coupled to said member for repositioning the latter in response to said error signal in the direction and to the extent required to reduce said error signal substantially to zero and hence to establish a condition of balance between said balancing voltage and said voltage drop, said energizing means for said element including at least one temperature-sensitive resistor connected in a circuit with said element between said bridge circuit input terminals to cause said current flow to be produced by said supply means, thereby to cause any change in the value of said balancing voltage due to a change in the value of said energizing voltage to be accompanied by corresponding, proportional, compensating changes in the values of said current and hence said voltage drop, said temperature-sensitive resistor being arranged to be responsive to said temperature of said device and to cause any change in the value of said balancing voltage due to a change in said temperature to be accompanied by corresponding, proportional, compensating changes in the values of said current and hence said voltage drop, whereby the position of said member for said balanced condition for any given value of said voltage drop is independent of the values of said energizing voltage and said temperature, and exhibiting means coupled to said member and indicative of the position thereof and hence of the value of said voltage drop.

5. Self-balancing measuring apparatus, comprising a strain-sensitive means exhibiting a related variation in the value of an electrical characteristic as the strain on said means is varied, a network into which said means is electrically connected and in which an electrical balancing signal of a value dependent upon the value of said electrical characteristic is compared with the value of an electrical effect to be measured to produce an error signal in an output of said network, electric motor means electrically connected to said output and having a motor shaft whose rotation is responsive to said error signal, drive means mechanically coupling said shaft to said strain-sensitive means to cause rotation of said shaft to vary the strain on said strain-sensitive means and hence the value of said characteristic in the direction and to the extent required to balance said effect, said drive means including a motor pulley driven by said motor shaft, a second shaft, a second pulley fixedly mounted on said second shaft, belt means coupling said second pulley and said motor pulley to impart rotation of said motor pulley to said second pulley and second shaft, a member in mechanical contact with said strain-sensitive means to vary the strain thereon as said member is deflected, and coupling means mechanically coupling said member to said second shaft to cause rotation of the latter to deflect said member, and index means carried by said belt means and positioned thereby along relatively fixed means, the adjusted value of said characteristic which balances said effect, and the corresponding adjusted condition of said strain-sensitive means and position of said index means along said fixed means, being a measure of the value of said effect.

6. Self-balancing measuring apparatus, comprising a deflectable member rigidly mounted at one end, resistance strain gauge means bonded onto said member adjacent said one end and exhibiting a related variation in electrical resistance as the strain on said gauge means is varied by the deflecting of said member, a network into which said gauge means is electrically connected and in which an electrical balancing signal of a value dependent upon the value of said resistance is effectively compared with the value of an electrical effect to be measured to produce an error signal in an output of said network, electric motor means electrically connected to said output and having a motor shaft whose rotation is responsive to said error signal, drive means mechanically coupling said shaft to said member to cause rotation of said shaft to vary the strain on said gauge means and hence the value of said resistance in the direction and to the extent required to balance said effect, said drive means including a motor pulley driven by said motor shaft, a second shaft, a second pulley fixedly mounted on said second shaft, belt means coupling said second pulley and said motor pulley to impart rotation of said motor pulley to said second pulley and said second shaft, a third pulley, a belt-like cable surrounding and in driven engagement with said second shaft and said third pulley to cause rotation of said second shaft to impart rotation to said third pulley, resilient means included in said cable, a second member fulcrumed at one end and secured at its other end to a point on said cable between said second shaft and said third pulley, and a connecting member mechanically coupling the other end of said deflectable member to said second member at a point adjacent the fulcrumed end thereof, and index means carried by said belt means and positioned thereby along relatively fixed means, the adjusted value of said resistance which balances said effect, and the corresponding adjusted condition of said gauge means and position of said index means along said fixed means, being a measure of the value of said effect.

7. Self-balancing measuring apparatus, comprising a plurality of unbonded strain-sensitive wires exhibiting a related variation in their electrical resistance as the strain on said wires is varied, a network into which said wires are electrically connected and in which an electrical balancing signal of a value dependent upon the value of said resistance is compared with the value of an electrical effect to be measured to produce an error signal in an output of said network, electric motor means electrically connected to said output and having a motor shaft whose rotation is responsive to said error signal, drive means mechanically coupling said motor shaft to said strain sensitive wires to cause rotation of said shaft to vary the strain on said wires and hence their resistance in the direction and to the extent required to balance said effect, said drive means including a motor pulley driven by said motor shaft, a second shaft, a second pulley fixedly mounted on said second shaft, belt means coupling said second pulley and said motor pulley to impart rotation of said motor pulley to said second pulley and second shaft, a first sector member in mechanical contact with said wires to vary the strain thereon as said member is rotationally deflected, a third pulley fixedly mounted on said second shaft, a third shaft, a second sector member and a fourth pulley fixedly mounted on said third shaft, a first band coupling said third pulley to said second sector member to impart the rotation of said second shaft to said third shaft, and a second band coupling said fourth pulley to said first sector member to impart the rotation of said third shaft to said first sector member, and index means carried by said belt means and positioned thereby along relatively fixed means, the adjusted value of said resistance which balances said effect, and the corresponding adjusted condition of said wires and position of said index means along said fixed means, being a measure of the value of said effect.

8. Self-balancing measuring apparatus, comprising a strain-sensitive device including at least one strain-sensitive element and a positionable member mechanically coupled to said element to cause the strain on the latter to be dependent upon the position of said member, said element being electrically connected into a balancing circuit having an input and an output, said device being characterized in that the application of a constant voltage to said input produces in said output a balancing voltage of a value which varies both as the position of said member and the temperature of said device vary, supply means for applying to said input a voltage which varies with said temperature so as to cause the value of said balancing voltage to be determined solely by the position of said member, a network into which said output is connected and in which the value of said balancing voltage is compared with the value of a voltage to be measured to produce an error signal in said network, and a motor connected to be responsive to the value of said error signal and mechanically coupled to said member to vary the position thereof and hence said balancing voltage in the direction and to the extent required to balance said voltage to be meausred, the adjusted position of said member and the corresponding adjusted value of said balancing voltage which balances said voltage to be measured being a measure of the value of the latter, wherein said supply means includes a power supply circuit having a supply output and a Zener diode connected to cause a voltage to be produced in said supply output which varies as the temperature of said diode varies, wherein said voltage in said supply output is said voltage which is applied to said input of said balancing circuit, and wherein said diode is arranged to be maintained at substantially the same temperature as said device.

9. Self-balancing measuring apparatus, comprising a strain-sensitive device including at least one strain-sensitive element and a positionable member mechanically coupled to said element to cause the strain on the latter to be dependent upon the position of said member, said element being electrically connected into a balancing circuit having an input and an output, said device being characterized in that the application of a constant voltage to said input produces in said output a balancing voltage of a value which varies both as the position of said member and the temperature of said device vary, supply means for applying to said input a voltage which varies with said temperature so as to cause the value of said balancing voltage to be determined solely by the position of said member, a network into which said output is connected and in which the value of said balancing voltage is compared with the value of a voltage to be measured to produce an error signal in said network, and a motor connected to be responsive to the value of said error signal and mechanically coupled to said member to vary the position thereof and hence said balancing voltage in the direction and to the extent required to balance said voltage to be measured, the adjusted position of said member and the corresponding adjusted value of said balancing voltage which balances said voltage to be measured being a measure of the value of the latter, wherein said supply means includes a power supply circuit having a Zener diode connected in a voltage regulating portion, having a pair of output terminals, and arranged to be connected to a source of energizing voltage to cause a supply voltage to be produced between said output terminals which is substantially independent of variations in said energizing voltage, but which increases as the temperature of said diode increases, said supply means also including a connection between its said output terminals and said balancing circuit input, wherein said diode is maintained at substantially the same temperature as said device to cause said supply voltage to increase as said temperature increases, and wherein said supply means includes a temperature sensitive resistor included in said connection and maintained substantially at said temperature to compensate for any change in said supply voltage with temperature in excess of that required to maintain said balancing voltage substantially independent of said temperature.

10. Apparatus as specified in claim 9, wherein said input of said balancing circuit includes a pair of input terminals, wherein said connection connects said input terminals to said output terminals of said supply circuit, and wherein said diode and resistor cooperate to cause a substantially constant current to flow between said input terminals.

11. Self-balancing measuring apparatus, comprising a strain-sensitive device including at least one strain-sensitive element and a positionable member mechanically coupled to said element to cause the strain on the latter to be dependent upon the position of said member, said element being electrically connected into a balancing circuit having a pair of input terminals arranged to receive an energizing voltage and having an output, said device being characterized in that the application of an energizing voltage to said input terminals produces in said output a balancing voltage of a value which varies as the position of said member, the value of said energizing voltage, and the temperature of said device vary, a network into which said output is connected and in which the value of said balancing voltage is compared with the value of a voltage to be measured to produce an error signal in said network, a motor connected to be responsive to the value of said error signal and mechanically coupled to said member to vary the position thereof and hence said balancing voltage in the direction and to the extent required to balance said voltage to be measured, and compensating means connected to said input terminals and responsive to said temperature to make the adjusted balance position of said member representative of solely the value of said voltage to be measured and independent of the value of said temperature, wherein said voltage to be measured is the voltage drop produced across a resistance element by the flow of a current therethrough, wherein said compensating means includes at least one temperature-sensitive resistor connected in a circuit with said element between said input terminals to cause said energizing voltage to produce said current flow through said element, thereby to cause said voltage drop to compensate for changes in said balancing voltage due to changes in said energizing voltage to make the adjusted balance position of said member independent of the value of said energizing voltage, and wherein said resistor is responsive to said temperature to cause said voltage drop to compensate for changes in said balancing voltage due to changes in said temperature.

12. Self-balancing measuring apparatus, comprising a strain-sensitive device including at least one strain-sensitive element and a positionable member mechanically coupled to said element to cause the strain on the latter to be dependent upon the position of said member, said element being electrically connected into a balancing circuit having a pair of input terminals and a pair of output terminals, supply means for applying an energizing voltage to said input terminals to produce between said output terminals a balancing voltage of a value dependent upon the position of said member, a pair of measuring terminals, a pair of error signal terminals, means connecting said output terminals and said measuring terminals in a series comparison circuit between said error terminals, said measuring terminals and the connections thereto being so constructed and arranged that there is substantially zero thermal e.m.f. developed between said measuring terminals, whereby the connection of the leads of a thermocouple to said measuring terminals causes the reference junction of the thermocouple to be formed between the thermocouple leads at the point of junction with said measuring terminals, a temperature-sensitive compensating resistor included in said connecting means and arranged to be maintained at substantially the same temperature as said measuring terminals, energizing means connected to said resistor for causing a substantially constant current to flow therethrough, the resulting voltage drop across said resistor in said series comparison circuit effectively modifying the total voltage produced between said measuring terminals by a thermocouple, when connected thereto, so as to leave for comparison with said balancing voltage in said comparison circuit an opposing voltage representative of solely the temperature of the hot junction of the thermocouple, the difference between said balancing and opposing voltages constituting an error signal between said error terminals, and means connected to said error terminals and responsive to said error signal for varying the position of said member and hence the value of said balancing voltage in the direction and to the extent required to reduce said error signal substantially to zero and hence to balance the apparatus, the adjusted position of said member which causes the apparatus to be balanced thus being a measure of the temperature of the hot junction of a thermocouple connected between said measuring terminals.

13. Apparatus as specified in claim 12, wherein said energizing means for said resistor include connections to said input terminals of said balancing circuit to cause said energizing voltage from said supply means to produce said current flow through said resistor.

14. Apparatus as specified in claim 13, wherein said balancing circuit tends to cause said balancing voltage to decrease as the temperature of said strain-sensitive device increases, wherein said supply means includes compensating means responsive to said temperature to cause said energizing voltage to increase as said temperature increases so as to maintain said balancing voltage substantially independent of said temperature, and wherein said energizing means for said compensating resistor include at least one temperature sensitive resistor which is responsive to said temperature and is connected between said input terminals and said compensating resistor to maintain said current flow therethrough independent of said temperature.

References Cited in the file of this patent

UNITED STATES PATENTS

| | | |
|---|---|---|
| 2,250,712 | Johnson | July 29, 1941 |
| 2,329,841 | Keinath | Sept. 21, 1943 |
| 2,596,955 | Howe | May 13, 1952 |
| 2,598,812 | Marco et al. | June 3, 1952 |
| 2,617,842 | Fink | Nov. 11, 1952 |
| 2,630,008 | Howe et al. | Mar. 3, 1953 |
| 2,844,775 | Miller et al. | July 22, 1958 |
| 2,871,701 | Knudsen | Feb. 3, 1959 |
| 2,876,642 | Scorgie | Mar. 10, 1959 |
| 2,883,617 | Lathrop | Apr. 21, 1959 |
| 2,889,518 | Hudson et al. | June 2, 1959 |
| 2,959,960 | Newbold | Nov. 15, 1960 |